US008675643B2

(12) United States Patent
Ishibashi

(10) Patent No.: US 8,675,643 B2
(45) Date of Patent: Mar. 18, 2014

(54) IP TELEPHONE SYSTEM AND IP TELEPHONE TERMINAL USED THEREIN

(75) Inventor: Masayuki Ishibashi, Hekinan (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 1357 days.

(21) Appl. No.: 12/164,467

(22) Filed: Jun. 30, 2008

(65) Prior Publication Data
US 2009/0003323 A1 Jan. 1, 2009

(30) Foreign Application Priority Data

Jun. 29, 2007 (JP) ................ P2007-173510
Mar. 31, 2008 (JP) ................ P2008-094280

(51) Int. Cl.
| | |
|---|---|
| H04L 12/66 | (2006.01) |
| H04L 12/16 | (2006.01) |
| H04J 3/22 | (2006.01) |
| G06F 15/16 | (2006.01) |
| G06F 15/173 | (2006.01) |

(52) U.S. Cl.
USPC .......... 370/354; 370/260; 370/466; 370/468; 709/224; 709/228; 709/231; 709/236

(58) Field of Classification Search
USPC ................. 370/260, 352–356, 466, 468; 709/204–207, 224, 228, 231, 236; 379/88.13–88.23; 358/1.1, 1.15, 400, 358/401, 404, 425, 474; 455/557
See application file for complete search history.

(56) References Cited

U.S. PATENT DOCUMENTS

| | | | | |
|---|---|---|---|---|
| 6,895,000 B2* | 5/2005 | Lai et al. | ........ | 370/352 |
| 7,860,071 B2* | 12/2010 | Hinrikus et al. | ........ | 370/338 |
| 8,160,557 B2* | 4/2012 | White et al. | ........ | 455/415 |
| 8,169,997 B2* | 5/2012 | Machida | ........ | 370/350 |
| 2002/0058530 A1* | 5/2002 | Akama | ........ | 455/556 |
| 2002/0112058 A1 | 8/2002 | Wiseman et al. | | |

(Continued)

FOREIGN PATENT DOCUMENTS

| | | |
|---|---|---|
| JP | H11-177755 A | 7/1999 |
| JP | 2002-152830 A | 5/2002 |

(Continued)

OTHER PUBLICATIONS

The State Intellectual Property Office of the People's Republic of China, Notification of First Office Action for Chinese Patent Application No. 200810129542.3 (counterpart to above-captioned patent application), issued Feb. 17, 2011.

(Continued)

*Primary Examiner* — Luat Phung
*Assistant Examiner* — Kai Chang
(74) *Attorney, Agent, or Firm* — Baker Botts L.L.P.

(57) ABSTRACT

An IP telephone system includes a first IP telephone terminal and a second IP telephone terminal. IP telephone communications are established between the first and second IP telephone terminals via Internet when the second IP telephone terminal has acquired identification data identifying the first IP telephone terminal. The second IP telephone terminal further acquires terminal data identifying a function that the first IP telephone terminal can control via Internet. The first IP telephone terminal receives from the second IP telephone terminal data instructing to execute the function that the first IP telephone terminal can control. Then, the first IP telephone terminal controls execution of the function identified by the data received from the second IP telephone terminal.

14 Claims, 15 Drawing Sheets

(56) References Cited

U.S. PATENT DOCUMENTS

| | | | |
|---|---|---|---|
| 2005/0162507 A1* | 7/2005 | Du | 348/14.01 |
| 2005/0185638 A1* | 8/2005 | Begis | 370/352 |
| 2005/0226264 A1* | 10/2005 | Toyoda | 370/431 |
| 2005/0238148 A1* | 10/2005 | Poustchi et al. | 379/88.17 |
| 2005/0265265 A1 | 12/2005 | Akama | |
| 2006/0072575 A1* | 4/2006 | Miyajima et al. | 370/392 |
| 2006/0184660 A1 | 8/2006 | Rao et al. | |
| 2006/0251060 A1 | 11/2006 | Iwakawa et al. | |
| 2006/0268842 A1* | 11/2006 | Takahashi et al. | 370/352 |
| 2007/0022233 A1* | 1/2007 | Bridges et al. | 710/62 |
| 2007/0206567 A1* | 9/2007 | Elias et al. | 370/352 |
| 2008/0239329 A1* | 10/2008 | Kitada et al. | 358/1.1 |
| 2009/0003542 A1* | 1/2009 | Ramanathan et al. | 379/88.13 |

FOREIGN PATENT DOCUMENTS

| | | |
|---|---|---|
| JP | 2002-353968 A | 12/2002 |
| JP | 2005-039342 A | 2/2005 |
| JP | 2005-80025 | 3/2005 |
| JP | 2005-192086 | 7/2005 |
| JP | 2006-019797 A | 1/2006 |
| JP | 2006-270837 A | 10/2006 |
| WO | 2006/034563 A1 | 4/2006 |

OTHER PUBLICATIONS

Japan Patent Office, Office Action for Japanese Patent Application No. 2008-094280 (counterpart to above-captioned patent application), mailed May 31, 2011.

Kumar et al., "Mobility Support for Universal Plug and Play (UPnP) Devices Using Session Initiation Protocol," 2006 IEEE Consumer Communication and Networking Conference, Las Vegas, NV, Jan. 8, 2006, vol. 2.

European Patent Office, European Search Report in counterpart Patent Application No. EP 08252233, mailed Jul. 24, 2009.

Japan Patent Office, Office Action for Japanese Patent Application No. 2008-094280 (counterpart to above-captioned patent application), mailed Mar. 21, 2012.

Japan Patent Office, Decision of Rejection for Japanese Patent Application No. 2008-094280 (counterpart Japanese patent application), mailed Dec. 4, 2012.

Japan Patent Office, Dismissal of Amendment for Japanese Patent Application No. 2008-094280 (counterpart Japanese patent application), mailed Dec. 4, 2012.

The State Intellectual Property Office of the People's Republic of China, Notification of the Third Office Action for Chinese Patent Application No. 200810129542.3 (counterpart Chinese patent application), issued Sep. 28, 2012.

* cited by examiner

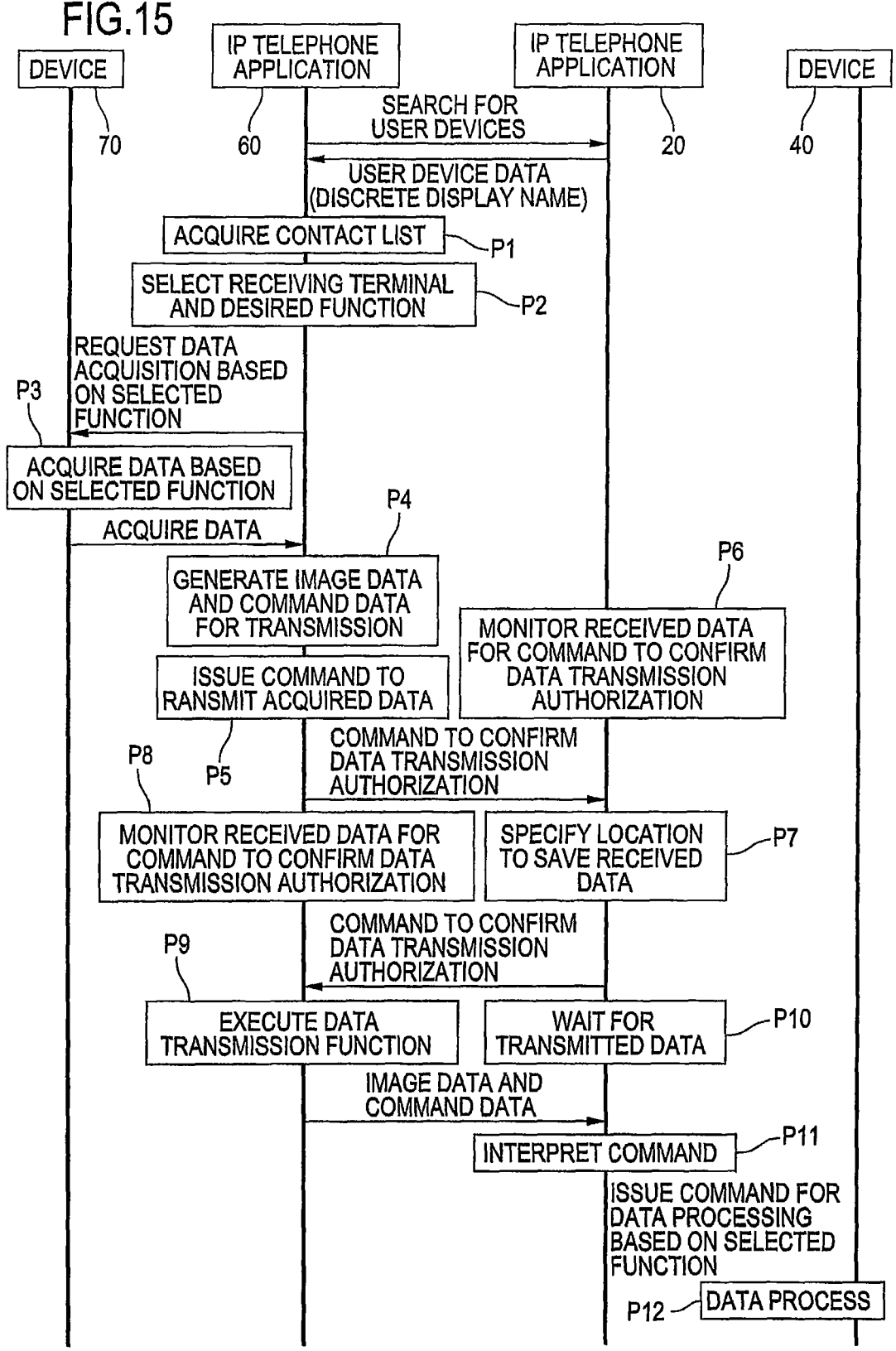

IP TELEPHONE SYSTEM AND IP TELEPHONE TERMINAL USED THEREIN

CROSS REFERENCE TO RELATED APPLICATIONS

This application claims priority from Japanese Patent Application Nos. 2007-173510 filed Jun. 29, 2007 and 2008-94280 filed Mar. 31, 2008. The entire content of each of these priority applications is incorporated herein by reference.

TECHNICAL FIELD

The present invention relates generally to an IP telephone system and a method of controlling the same.

BACKGROUND

Internet Protocol (IP) telephone systems such as Skype (registered trademark) have become commonplace in recent years. The IP telephone system can be used simply by installing an IP telephone application on a PC or other network terminal, where the IP telephone application is software developed by the IP telephone provider for originating and receiving calls and implementing voice communications.

Japanese patent application publication No. 2005-192086 describes one such IP telephone system having a server that registers information on network terminals. With this system, each transceiver terminal is provided with a function for referencing the information registered on the server. Therefore, the user can acquire information on other terminals and can transmit data that the other terminals can process. Japanese patent application publication No. 2005-080025 discloses other related technologies for IP telephones.

However, it is difficult to learn information about other callers in the conventional IP telephone systems. Specifically, one caller either cannot recognize what type of IP telephone terminal the other caller is using or cannot recognize what functions are available on the other IP telephone terminal. Hence, even when the other caller is using an IP telephone terminal equipped with various functions, such as a print function and an optical character recognition (OCR) function, the caller cannot sufficiently take advantage of these functions. In other words, the resources of the IP telephone system are not effectively utilized and, therefore, are wasted.

Japanese patent application publication No. 2005-192086 describes a convenient communication system in which a communication apparatus can execute a function not supported by the communication apparatus itself but possessed by another device. However, there is no description of a structure that can resolve the above problem, that is, how to recognize the type of the other device and the functions possessed thereby.

The description of Japanese patent application publication No. 2005-080025 asserts that a transmitting device transmitting images and a receiving device receiving the images can identify which communication method is supported by both parties using Session Description Protocol (SDP) media stream descriptions expanded by a Session Initiation Protocol (SIP) message, but this technology does not sufficiently resolve the problem described above.

Skype, which offers a free IP telephone application and free calls, has enjoyed much popularity. One factor enabling Skype to offer free calls may be its use of peer-to-peer communications, which eliminates the need for a server. However, one problem with IP telephone systems such as Skype that do not employ a server is that the system cannot recognize that a call is coming from a telephone terminal when a user is making an IP telephone call from a telephone terminal connected to a network terminal, such as a PC.

The technology disclosed in Japanese patent application publication No. 2005-192086 may be incorporated in an IP telephone system such as Skype by introducing a server into the system in order to register information on external terminals. The server could be referenced to recognize when a call is coming from an external terminal. However, introducing a server would make the system more complex and expensive, which would have a great impact on a system such as Skype that charges little or no usage fees.

SUMMARY

In view of the foregoing, it is an object of the invention to provide a new technology as an option for resolving the problems associated with the conventional IP telephone systems described above; i.e., the difficulty of acquiring information about other callers, resulting in one caller either being unable to recognize what type of IP telephone terminal the other caller is using or being unable to recognize what functions are available on the other IP telephone terminal.

Briefly, the invention provides an IP telephone system and an IP telephone terminal used therein, and a method of controlling an IP telephone system capable of recognizing terminal data on a network terminal itself or on a telephone terminal connected to the network terminal without use of a server, even an IP telephone system such as Skype.

To achieve the above and other objects, there is provided an IP telephone terminal including:
an identification data storing section that stores identification data identifying the IP telephone terminal;
a communicating section that allows the another IP telephone terminal to establish IP telephone communications with another IP telephone terminal via Internet when the another IP telephone terminal has acquired the identification data stored in the identification data storing section;
an IP telephone function controlling section that is configured to control execution of an IP telephone function used to implement a telephone call through the IP telephone communications with the another IP telephone terminal;
a function execution controlling section that is configured to control execution of a function specified in data received from the another IP telephone terminal through the IP telephone communications;
a terminal data storing section that stores terminal data identifying a function that the IP telephone terminal can control; and
a transmitting section that is configured to transmit the identification data and the terminal data over the Internet in a correlated state.

According to another aspect of the invention, there is provided an IP telephone system including:
a first IP telephone terminal including an identification data storing section that stores identification data identifying the first IP telephone terminal, and a terminal data storing section that stores terminal data identifying a function that the first IP telephone terminal can control; and
a second IP telephone terminal including an identification data acquiring section that is configured to acquire the identification data and the terminal data of the first IP telephone terminal in a correlated state,
wherein the first IP telephone terminal and the second IP telephone terminal can implement an IP telephone call via Internet.

According to another aspect of the invention, there is provided an IP telephone system including a network terminal and an external terminal. The network terminal includes an Internet connecting section, an identification data storing section, a telephone device, a terminal data acquiring section, an IP telephone application and a connection interface. The Internet connecting section connects to an Internet. The identification data storing section stores identification data identifying the network terminal. The telephone device having an IP communication auxiliary function used to implement an auxiliary function can be implemented alone or together with a telephone call through the IP telephone communications with the external device. The terminal data acquiring section is configured to acquire terminal data. The terminal data indicates the IP communication auxiliary function and is stored in the identification data storing section as identification data. The IP telephone application implements IP telephone communications between the telephone device and the external terminal that acquired the identification data stored in the identification data storing section. The connection interface connects the telephone device to the external terminal and allows to implement the IP communication auxiliary function with the external terminal via the IP telephone application The external terminal includes a receiving section that receives the identification data via the Internet, and a displaying section that displays the received identification data.

According to yet another aspect of the invention, there is provided a method of controlling an IP telephone system including a first IP telephone terminal and a second IP telephone terminal, the method including:

allowing the another IP telephone terminal to establish IP telephone communications between the first IP telephone terminal and the second IP telephone terminal via Internet when the second IP telephone terminal has acquired identification data identifying the first IP telephone terminal, the second IP telephone terminal further acquiring terminal data identifying a function that the first IP telephone terminal can control via Internet;

the first IP telephone terminal receiving from the second IP telephone terminal data instructing to execute the function that the first IP telephone terminal can control; and the first IP telephone terminal controlling execution of the function identified by the data receive from the second IP telephone terminal.

According to still another aspect of the invention, there is provided an IP telephone collaborative computer program product comprising a computer usable medium having readable program code embodied in the medium, the IP telephone collaborative computer program product includes a component to acquire terminal data indicating a model or function of a peripheral device when the peripheral device is connected to a network terminal.

The IP telephone collaborative program product may further include a component to determine a connected state of the peripheral device to the network terminal, wherein the terminal data is acquired when the connected state of the peripheral device has changed.

The IP telephone collaborative program product may further include components to store input of identification data identifying the network terminal and storing the identification data in an designated area of a memory; and store the terminal data in the designated area of the memory by inputting the terminal data into an IP telephone application as the identification data using a function provided standard in the IP telephone application for inputting identification data into the IP telephone application.

The IP telephone collaborative program product may further includes a component to encode the terminal data to produce encoded terminal data, store the encoded terminal data is stored in the designated area of the memory.

The IP telephone collaborative program product may further include components to receive the terminal data inputted by a user; and store the terminal data in the designated area of the memory by inputting the received data into an IP telephone application as the identification data using a function provided standard in the IP telephone application for inputting identification data into the IP telephone application.

The IP telephone collaborative program product may further include components to issue a command to an IP telephone application to output the identification data stored in the designated area of the memory; acquire the identification data outputted by the IP telephone application; and generate discrete identification data by attaching the terminal data to identification data; and store the discrete identification data in the designated area of the memory. Further, the IP telephone collaborative program product may include components to determine a type of identification data; update the terminal data included in the discrete identification data when the identification data as acquired is the discrete identification data; and add the terminal data as acquired to the identification data as acquired when the identification data as acquired is not the discrete identification data. Further, the IP telephone collaborative program product may further include components to store a terminal data list including a plurality of pieces of terminal data; determine that the identification data as acquired is not the discrete identification data when the identification data is not included in the terminal data list; and determine that the identification data is the discrete identification data when the identification data is included in the terminal data list.

BRIEF DESCRIPTION OF THE DRAWINGS

In the drawings:

FIG. 15 is a sequence chart showing the flow of processes performed on the IP telephone system according to the fifth embodiment.

DESCRIPTION OF THE PREFERRED EMBODIMENTS

Next, an IP telephone system and method of controlling the IF telephone system will be described. First through fourth embodiments will be described in FIGS. 1 through 13 and fifth embodiments will be described in FIGS. 14 and 15.

<Basic Principles>

Figure 1:
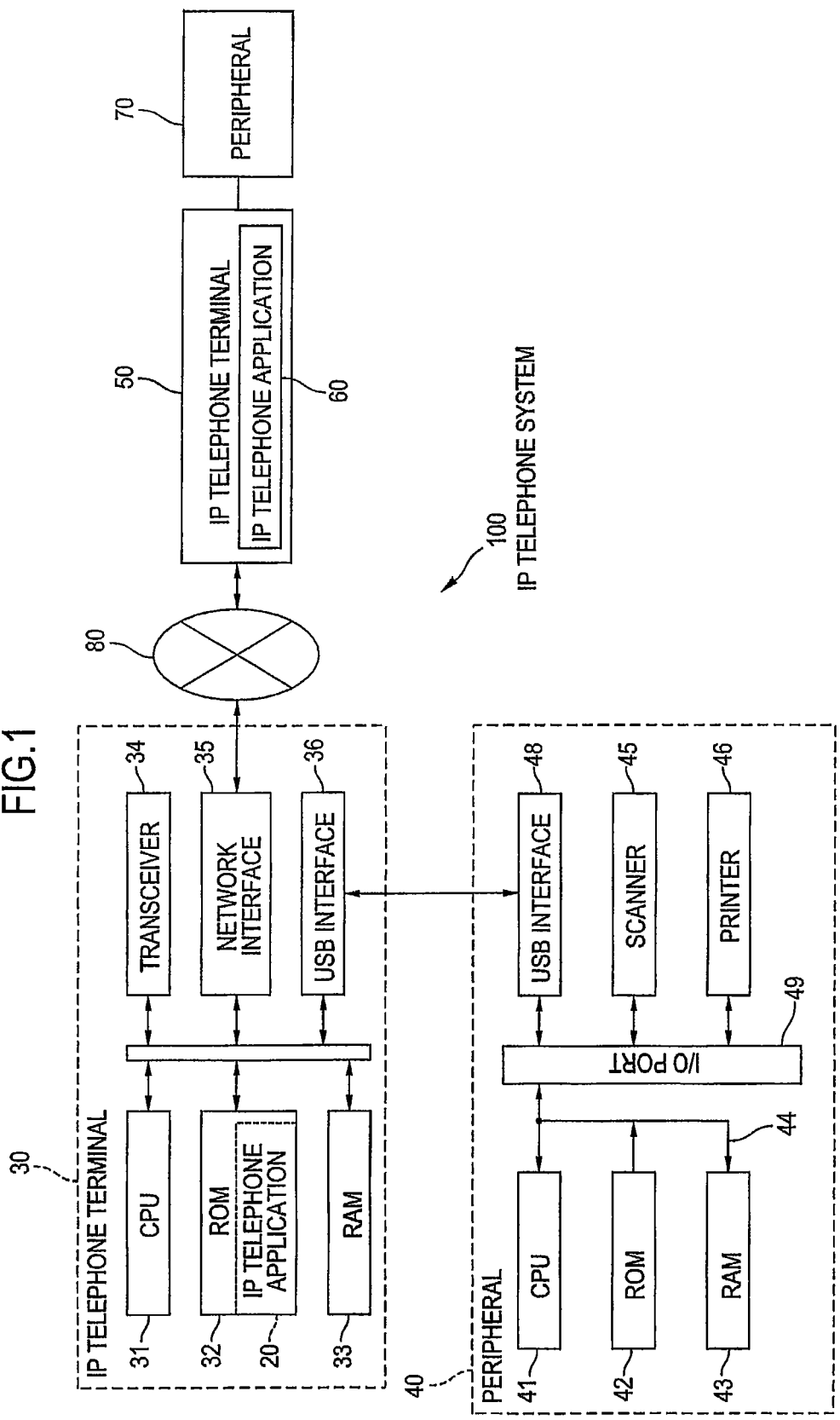
FIG. 1 is a block diagram showing the electrical structure of an IP telephone system according to the fifth embodiment.

An electrical structure of a typical IP telephone system to which the invention is applicable will be described with reference to FIG. 1. As shown in FIG. 1, the IP telephone system 100 includes an IP telephone terminal 30 in which an IP telephone application to be described later has been installed, a peripheral device 40 connected to the IP telephone terminal 30, and another IP telephone terminal 50 that can communicate with the IP telephone terminal 30 through IP telephone communications.

As shown in FIG. 1, the IP telephone terminal 30 includes a CPU 31, a ROM 32, and a RAM 33. In addition, the IP telephone terminal 30 has a transceiver 34 and a network interface 35 for implementing IP telephone communications via an Internet 80 with other IP telephone terminals that have acquired the display name of the IP telephone terminal 30; and a USB interface 36 capable of connecting the IP telephone terminal 30 to an external device.

The CPU 31 controls each component of the IP telephone terminal 30 based on fixed values and programs stored in the ROM 32 and RAM 33. The ROM 32 serves to store the IP telephone application 20. The RAM 33 is a readable and writable memory for temporarily storing data required in processes performed by the CPU 31.

By reading the IP telephone application 20 from the ROM 32 and executing the application, the CPU 31 of the IP telephone terminal 30 functions as an IP telephone function controller for controlling the execution of an IP telephone function designed to implement a telephone call with another IP telephone terminal through IP telephone communications.

Further, by reading and executing the IP telephone application 20, the CPU 31 of the IP telephone terminal 30 can serve as a function execution controller for controlling the execution of a function specified in a data file received from the other IP telephone terminal 50 described later through IP telephone communications. More specifically, the CPU 31 of the IP telephone terminal 30 can control various functions possessed by the IP telephone terminal 30 itself, as well as a print function, OCR function, and scan function possessed by the peripheral device 40 connected to the IP telephone terminal 30, for example.

The various functions possessed by the IP telephone terminal 30 may include an OCR function for scanning characters in an image that is reproduced from image data received from another IP telephone terminal and for converting these characters into text data, or a translation function for translating text data received from another IP telephone terminal from English to Japanese, for example.

In the example shown in FIG. 1, the IP telephone terminal 30 and peripheral device 40 are connected by a USB cable. However, the IP telephone terminal 30 can also control devices connected to the IP telephone terminal 30 via a LAN.

The peripheral device 40 shown in FIG. 1 is provided with a CPU 41, a ROM 42 for storing various control programs executed by the CPU 41 and various data, and a RAM 43 for temporarily storing print data and control signals received from the IP telephone terminal 30 connected to the peripheral device 40. The CPU 41, ROM 42, and RAM 43 are interconnected via a bus line 44 and connected to an I/O interface 49 via the bus line 44.

The I/O interface 49 is further connected to a USB interface 48 capable of connecting the peripheral device 40 to an IP telephone terminal 30, a scanner 45, and a printer 46. By controlling each component of the peripheral device 40, the CPU 41 can execute an OCR function for scanning characters in an image reproduced from image data received from another IP telephone terminal through IP telephone communications and for converting these characters to text data, or can execute a print function for printing print data received from another IP telephone terminal through IP telephone communications on recording paper.

The IP telephone terminal 50 is capable of performing IP telephone communications with the IP telephone terminal 30. Since the structure of the IP telephone terminal 50 is substantially the same as that of the IP telephone terminal 30 in the illustrated example, a detailed electrical structure of the IP telephone terminal 50 is not shown in FIG. 1 nor will be described herein. The IP telephone terminal 50 has an IP telephone application 60 installed thereon that is the same program as the IP telephone application 20 described above.

The IP telephone terminal 30 executes a device connection monitoring process, a device data string adding process, and a device data string determining process with a device data string adding module 3 to be described with reference to FIG. 2.

By executing these three processes, the IP telephone terminal 30 can record a discrete display name configured of a base display name and associated device data string as will be described with reference to FIG. 3.

The IP telephone terminal 30 can perform a control process to update its device data so that the device data includes data indicating the model of an external device when the external device is determined to be connected and does not include data indicating the model of the external device when the external device is determined not to be connected. Here, "data indicating the model" may be data that can be used to identify the model, such as the vendor name or device type, or a model name.

In a process performed on the IP telephone system 100 described above, the IP telephone application installed on the IP telephone terminal 30 acquires data from the peripheral device 70 connected to the IP telephone terminal 50 and processes this data on the device 40 connected to the IP telephone terminal 30. Also, the IP telephone application installed on the IP telephone terminal 30 sends data on the peripheral device 40 connected to the IP telephone terminal 30 to the IP telephone terminal 50 for allowing the IP telephone terminal 50 to acquire data on the peripheral device 40 connected to the IP telephone terminal 30.

Figure 2:
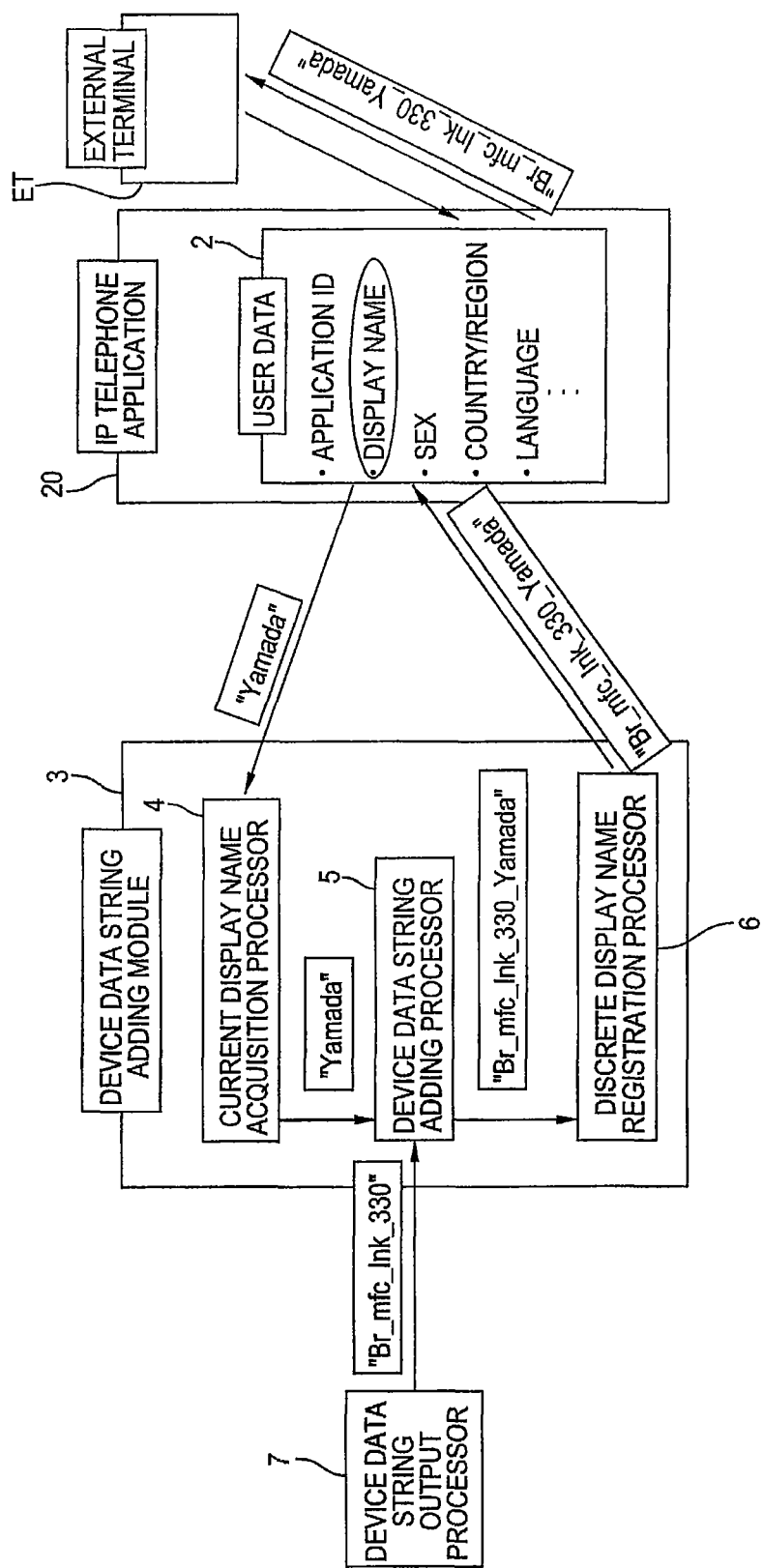
FIG. 2 is a block diagram showing the relationship between an IP telephone application and a device data string adding module operating in collaboration with the IP telephone application according to first through fourth embodiments.

FIG. 2 is a block diagram illustrating the basic principles of the first through fourth embodiments related to an IP telephone application 20, and a device data string adding module 3 that operates in collaboration with the IP telephone application 20.

The IP telephone application 20 is installed on a network terminal or the IP telephone terminal 30 and can perform a telephone call with the other IP telephone terminal 50 via the Internet. In FIG. 2, the other IP telephone terminal 50 and its associated peripheral device 70 as shown in FIG. 1 will collectively referred to as "external terminal ET"). One specific example of the IP telephone application 20 is the Skype communication software.

The external terminal ET searches broadly for the IP telephone application which is able to implement a telephone call via an Internet 80, issues a request for the display name of the IP telephone application 20 and acquires the received display name. The external terminal ET is also provided with a function for displaying the acquired display name. Therefore, the user can make a selection of the other party by referring to the display name.

Therefore, a unique display name can be set for an IP telephone application to notify other users who the user of the IP telephone is. Since the discrete display name includes a unique display name and terminal data providing information on the terminal and is registered in the IP telephone application, data indicating who the user is and what terminal the user is using can be conveyed to other users.

The external terminal ET is provided with a function for transmitting electronic data, such as a PC file, to the IP telephone application 20. This function enables the user to transmit data for a map, for example, to another party while discussing a meeting place with this party. Upon receiving the map data, the other party can print out the map on a printer to learn precisely where the meeting place is.

The IP telephone application 20 contains user data 2 that includes an application ID, a display name, the user's sex, the country/region in which the user resides, the user's language, and other data. The IP telephone application 20 includes an application program interface (API) having a set of functions provided standard in the IP telephone application 20, such as functions for reading and writing the user data 2.

The device data string adding module 3 is also installed on a network terminal or a telephone terminal and includes a current display name acquisition processor 4, a device data string adding processor 5, and a discrete display name registration processor 6. The current display name acquisition processor 4 can issue a request to the API of the IP telephone application 20 using a Windows (registered trademark) message to acquire the current display name in the user data 2 ("Yamada" in this example). Here, the Windows message is a function for calling the API in the IP telephone application 20 from the device data string adding module 3.

Since the current display name acquisition processor 4 uses the API of the IP telephone application 20, the device data string adding module 3 can easily be introduced into an existing system to work together with existing IP telephone applications currently in circulation, such as Skype.

The device data string adding processor 5 adds a device name e.g., "Br_mfc_Ink_330", outputted from a device data string output processor 7 described later, which processor is provided outside the device data string adding module 3, to the precedence of the current display name "Yamada" acquired by the current display name acquisition processor 4 to generate a discrete display name "Br_mfc_Ink_330_Yamada".

Figure 3:
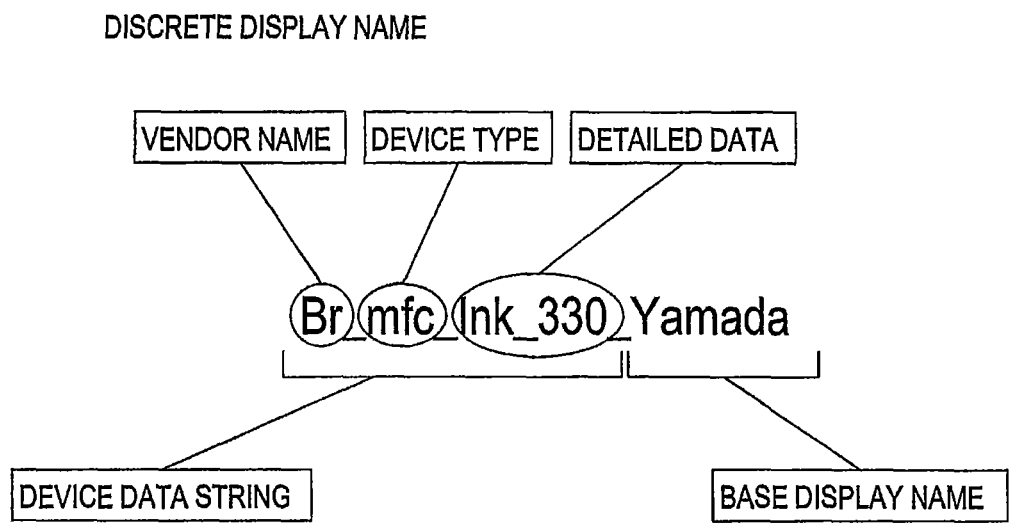
FIG. 3 is an explanatory diagram showing the components of a discrete display name.

FIG. 3 illustrates the components of the discrete display name. The discrete display name is broadly divided into a device data string and a base display name. The device data string is configured of a vendor name "Br", a device type "mfc", and detailed data "Ink_330".

Returning to FIG. 2, the discrete display name registration processor 6 registers the discrete display name "Br_mfc_Ink_330_Yamada" generated by the device data string adding processor 5 in the user data 2 of the IP telephone application 20 by issuing a Windows message to the API used to register the display name.

First Embodiment

Next, the device data string output processor 7 according to a first embodiment will be described in greater detail.

Figure 4:
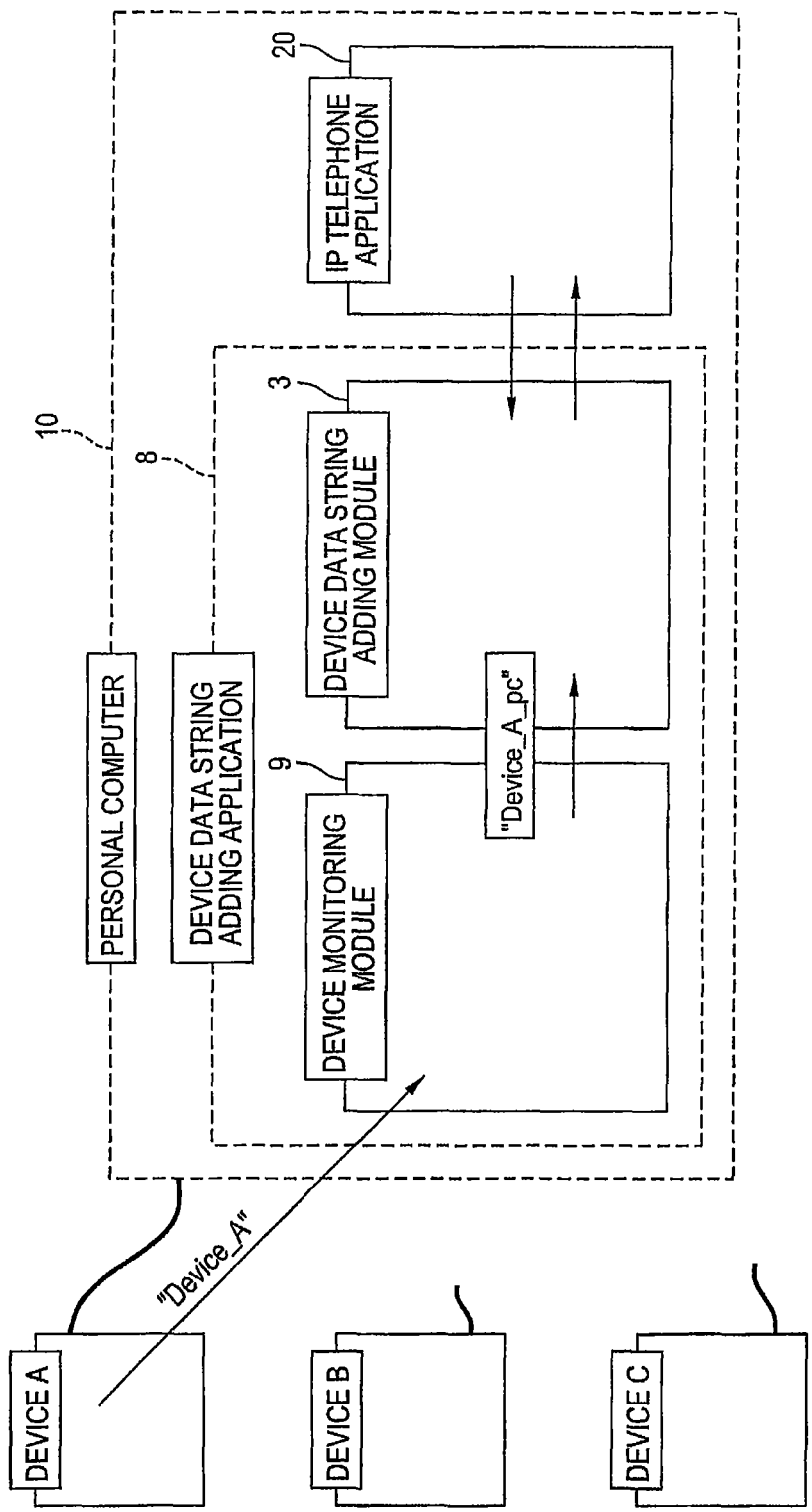
FIG. 4 is a block diagram illustrating operations of the device data string adding application when a device A is connected to a personal computer on which the application is installed.

FIG. 4 illustrates operations of a device data string adding application 8 when a peripheral device (hereinafter referred simply to as "device") A is connected to a personal computer 10. FIG. 4 depicts devices A, B and C which indicate IP telephone-capable devices or telephone terminals different in type. The device data string adding application 8 includes a device monitoring module 9, and the device data string adding module 3 described earlier. The device monitoring module 9 monitors connections to the personal computer 10 to determine what type of IP telephone-capable devices (telephone terminals) have been connected to or disconnected from the personal computer 10.

Since device A is connected to the personal computer 10 in FIG. 4, the device monitoring module 9 receives the device name "Device_A" from device A. The device monitoring module 9 adds "pc" to the device name indicating that the device is a computer-based IP telephone using the personal computer 10 and outputs the resulting "Device_A_pc" to the device data string adding module 3.

Figure 5:
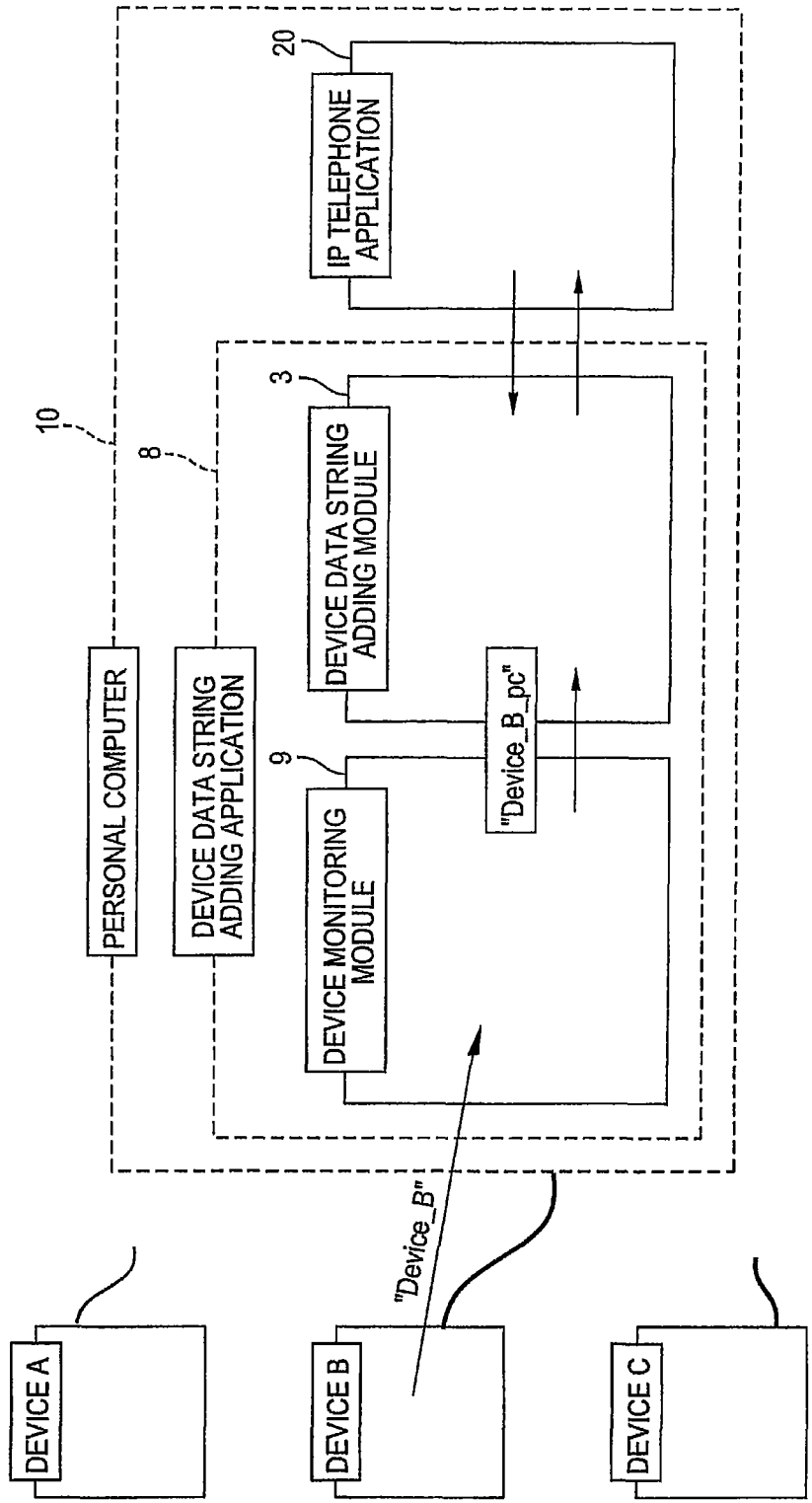
FIG. 5 is a block diagram illustrating operations of the device data string adding application when a device B is connected to the personal computer.
Figure 6:
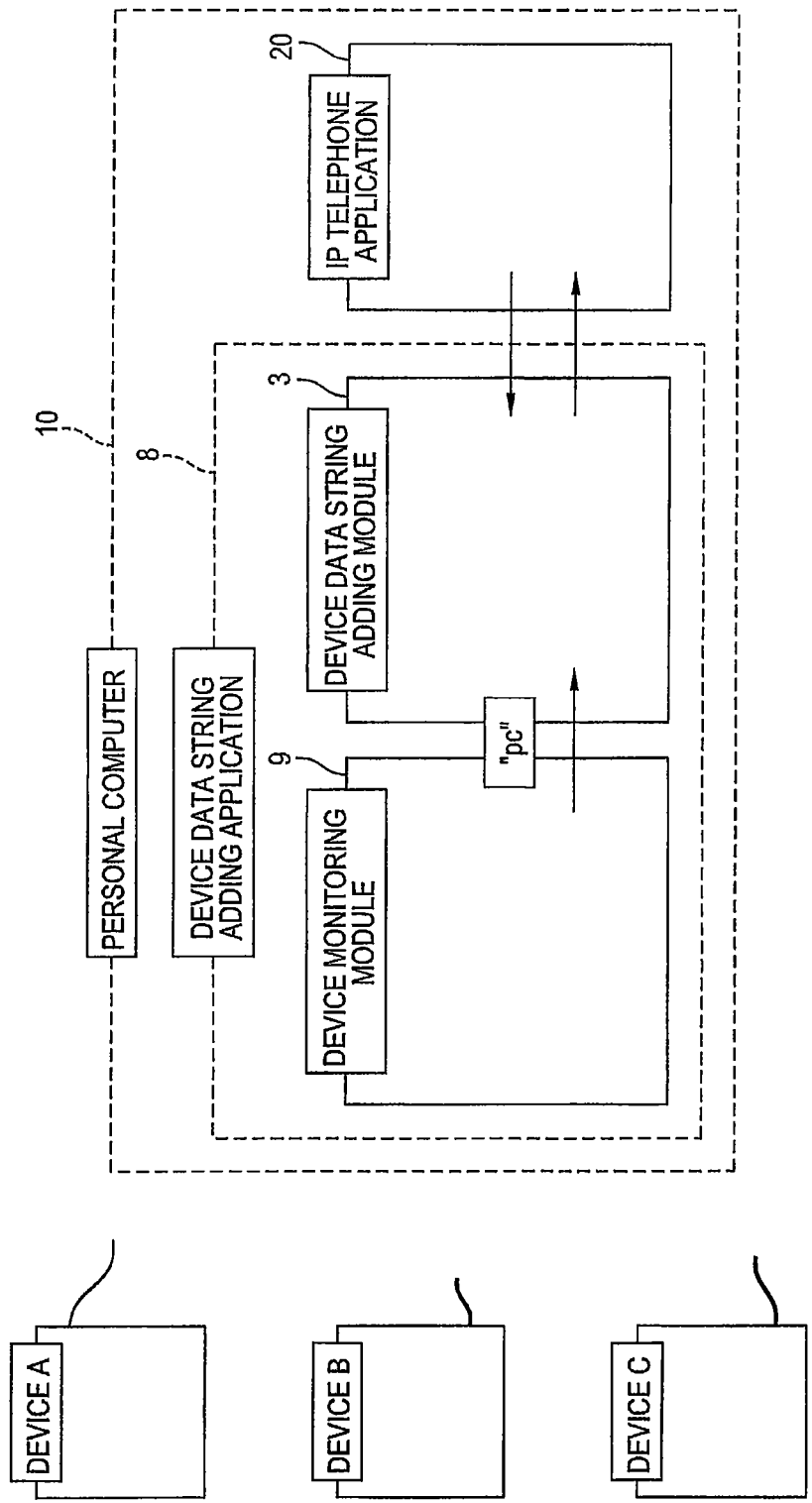
FIG. 6 is a block diagram illustrating operations of the device data string adding application when all devices have been disconnected from the personal computer.

When device A is disconnected from the personal computer 10 and a device B is connected to the personal computer 10, as shown in FIG. 5, the device monitoring module 9 receives the device name "Device_B" from device B. Next, the device monitoring module 9 adds "pc" to the device name to indicate that the device is an IP telephone originating from the personal computer 10 and outputs the resulting "Device_B_pc" to the device data string adding module 3. When all devices have been disconnected from the personal computer 10, as shown in FIG. 6, the device monitoring module 9 simply outputs "pc" to the device data string adding module 3 to indicate an IP telephone originating from the personal computer 10.

By performing the processes described above, another IP telephone can determine the type of device to which this IP telephone belongs based on the display name, i.e., whether the IP telephone is installed on the personal computer 10 (a "softphone") or provided in a peripheral device.

In the first embodiment, terminal data is used to indicate the type of device connected to the personal computer 10, and the terminal data of the personal computer 10 is used when a device is not connected to the personal computer 10. Therefore, with the above-described terminal data acquisition process, terminal data indicating the personal computer can be acquired when a peripheral device is not connected. Further, in the first embodiment, another IP telephone can dynamically recognize terminal data for devices connected to the personal computer 10 (network terminal).

Figure 7:
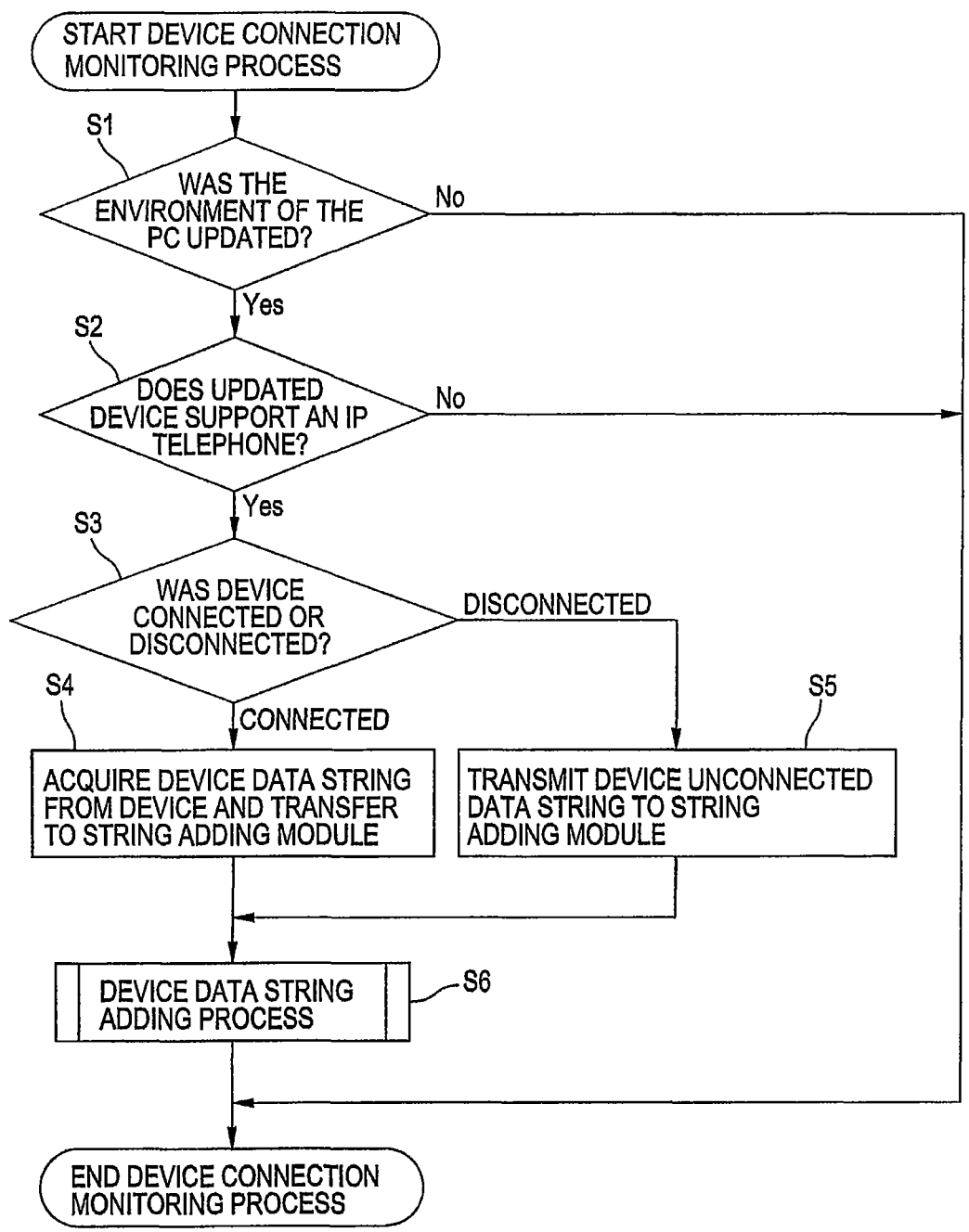
FIG. 7 is a flowchart illustrating steps in a device connection monitoring process.
Figure 8:
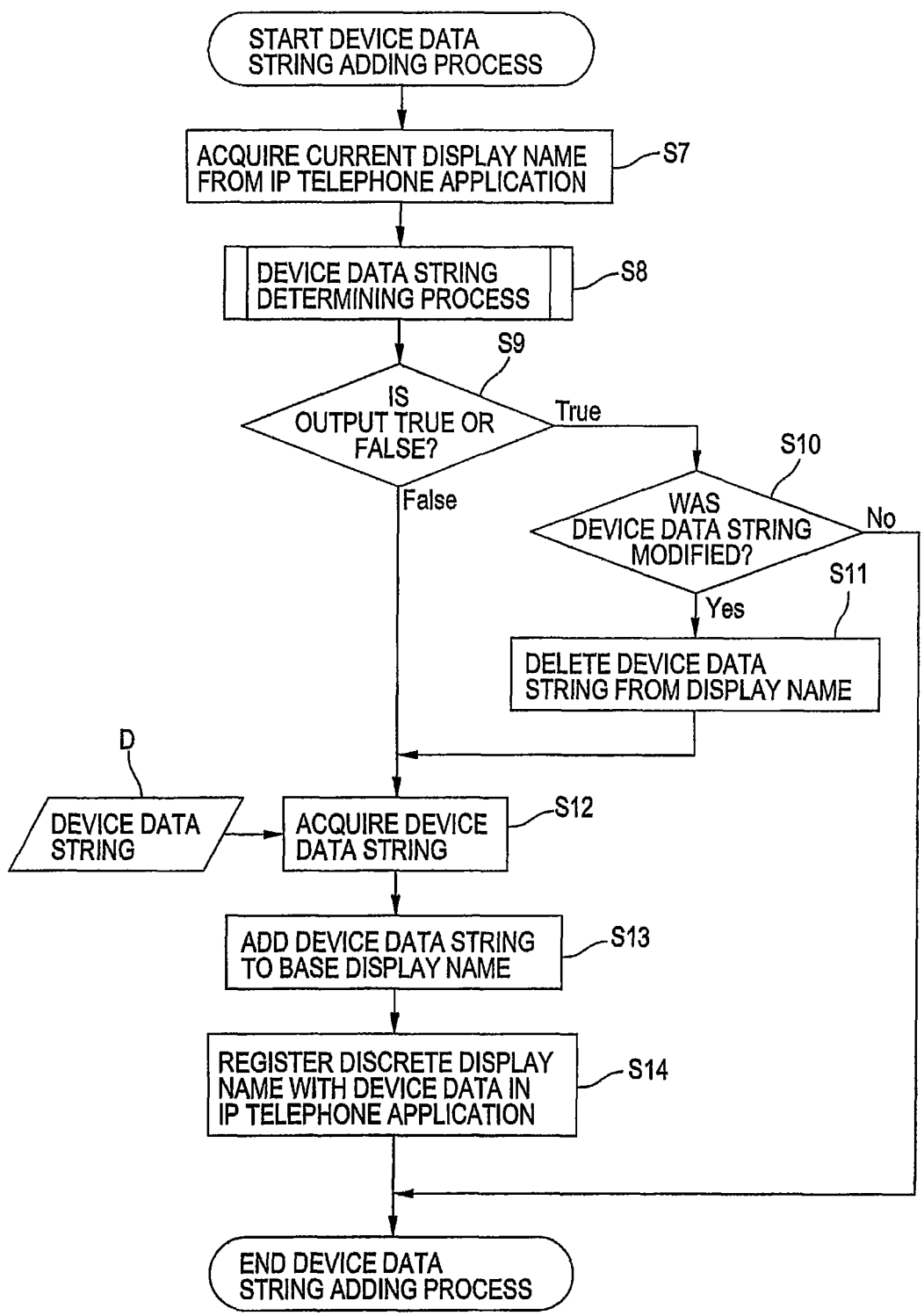
FIG. 8 is a flowchart illustrating steps in a device data string adding process.
Figure 9:
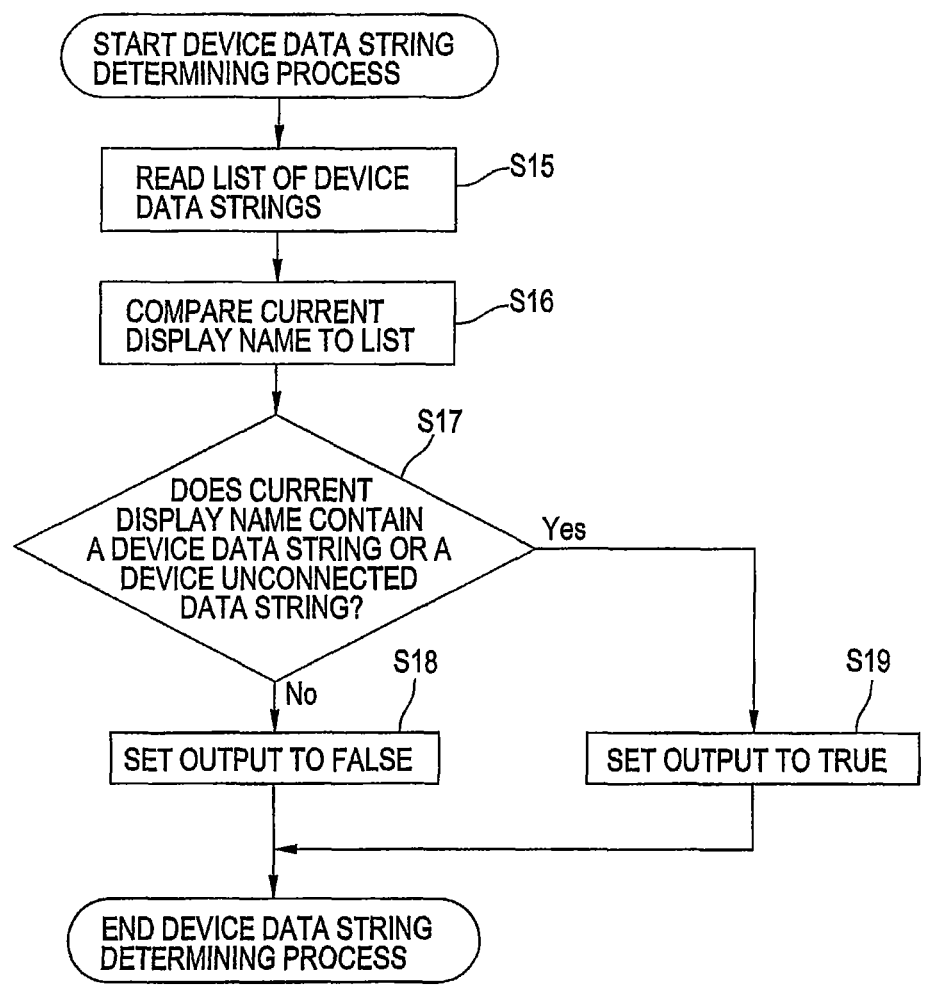
FIG. 9 is a flowchart illustrating steps in a device data string determining process.

Next, a procedure performed by the device data string adding application 8 according to the first embodiment will be described with reference to FIGS. 7 through 9. FIG. 7 is a flowchart illustrating steps in a device connection monitoring process. FIG. 8 is a flowchart illustrating steps in a device data string adding process. FIG. 9 is a flowchart illustrating steps in a device data string determining process.

The process described in S1-S5 of FIG. 7 is implemented with the device monitoring module 9, while the process beginning from S6 is implemented with the device data string adding module 3.

In S1 of FIG. 7 the device data string adding application 8 determines whether the device environment of the personal computer 10 has been updated. The application 8 advances to S2 if the environment has been updated (S1: YES) and ends the device connection monitoring process if not updated (S1: NO).

For devices connected by a USB cable, the application 8 can obtain the updated status from the operating system (OS), which monitors the connection status of USB devices.

For devices connected via a local area network (LAN), the application 8 broadcasts a packet over the LAN requesting prescribed data, and subsequently receives the prescribed data from each device on the LAN. If the application 8 receives prescribed data from a new device, the application 8 can determine that this device is connected to the LAN. If the application 8 does not receive the data from a device from which data was previously received, the application 8 can determine that this device has been disconnected from the LAN.

For cases in which devices are connected to the personal computer 10 by some other interface, the application 8 issues a command for prescribed data via this interface and subsequently receives the prescribed data. When receiving data from a new device, the application 8 can determine that this device has been connected to the personal computer 10. When data is not received from a device from which data was previously received, the application 8 can determine that this device has been disconnected.

In S2 the application 8 determines whether the updated device supports an IP telephone. The application 8 advances to S3 if the device supports an IP telephone (S2: YES) and ends the device connection monitoring process if the device does not support an IP telephone (S2: NO). In S3 the device data string adding application 8 determines whether the device was connected to the personal computer 10 or disconnected therefrom. The application 8 advances to S4 when the device was connected to the personal computer 10 (S4: connected), and advances to S5 if the device has been disconnected (S4: disconnected).

In S4 the application 8 acquires a device data string from the connected device, adds "pc" to the end of this string, and transmits the resulting string to the device data string adding module 3. For example, if device A has been connected to the personal computer 10, as shown in FIG. 4, the device monitoring module 9 acquires the device data string "Device_A" from device A, adds "pc" to the end of this string, and transmits the resulting string "Device_A_pc" to the device data string adding module 3.

In S5 the application 8 transmits a device unconnected data string to the device data string adding module 3. The device unconnected data string in the first embodiment is simply "pc". For example, when all devices are disconnected from the personal computer 10, as shown in FIG. 6, the device monitoring module 9 simply transmits the device unconnected data string "pc" to the device data string adding module 3.

In S6 the device data string adding application 8 executes the device data string adding process, which is described in greater detail in FIG. 8. Next, this device data string adding process will be described with reference to FIG. 8.

In S7 the application 8 acquires the current display name from the IP telephone application 20. As described above, the device data string adding module 3 acquires the current display name by issuing a Windows message to the API provided in the IP telephone application 20. In S8 the application 8 executes a device data string determining process, which is described in greater detail in FIG. 9. Here, the device data string determining process will be described with reference to FIG. 9.

In S15 of this process, the application 8 reads a list of device data strings that were installed on the personal computer 10 together with the application 8. The device data strings for all devices are compiled in a list when the application 8 is created. In S16 the application 8 compares the current display name acquired from the IP telephone application 20 to the list of device data strings. In S17 the application 8 determines whether the current display name contains a device data string or a device unconnected data string. An example of the device data string is "Device_A_pc" in FIG. 4, while an example of the device unconnected data string is "pc" in FIG. 6.

The application 8 advances to S19 if the current display name contains a device data string or a device unconnected data string (S17: YES) and advances to S18 if not (S17: NO). In S18 the application 8 sets the output to "False" since the current display name contains neither a device data string nor a device unconnected data string, and subsequently ends the device data string determining process. In S19 the application 8 sets the output to "True" since the current display name contains either a device data string or a device unconnected data string, and subsequently ends the device data string determining process.

The process executed through S15-S19 can prevent terminal data from being recorded more than once in the list of device data strings.

Returning to the device data string adding process of FIG. 8, after completing the determining process in S8, the application 8 determines in S9 whether the output is "True" or "False." The application 8 advances to S10 if the output is "True" (S9: True) and advances to S12 if "False" (S9: False).

In S10 the application 8 determines whether to modify the device data string based on a user setting. The application 8 advances to S11 if the device data string is to be modified (S10: YES), and ends the device data string adding process if the device data string is not to be modified (S10: NO). In S11 the application 8 deletes the device data string from the current display name so that only the base display name is allocated to each user environment. Subsequently, the application 8 advances to S12.

In S12 the application 8 acquires a device data string D. In this embodiment, the device data string D is generated by the device monitoring module 9. In S13 the application 8 adds the base display name to the device data string to generate a discrete display name. For example, if the base display name is "Yamada" and the device data string is "Device_A_pc," the application 8 generates "Device_A_pc_Yamada" as the discrete display name.

In S14 the application 8 records the discrete display name in the IP telephone application. As described above, the device data string adding module 3 records this discrete display name by issuing a Windows message to the API provided in the IP telephone application 20. Subsequently, the application 8 ends the device data string adding process. In this way, the network terminal can acquire the latest display name, generate a discrete display name, and register the discrete display name in the IP telephone application.

The process through S7-S13 described above generates a discrete display name by adding the device data string D to the base display name (S12-S13) when a base display name was acquired in S7, and generates the discrete display name by updating the device data string in the discrete display name to the device data string D (S10-S13) when a discrete display name was acquired in S7.

By performing the process in S7 to acquire the current display name and the process in S8-S13 to generate a discrete display name having the device data string D added to the current display name, the application 8 can acquire the latest display name, generate a discrete display name, and register the discrete display name in the IP telephone application 20. And, new terminal data is added to the discrete display name, resources of a network terminal can be effectively utilized based on the new data for the network terminal.

After completing the device data string adding process of S6 in FIG. 7, the application 8 ends the device connection monitoring process.

<First Variation>

Figure 10:
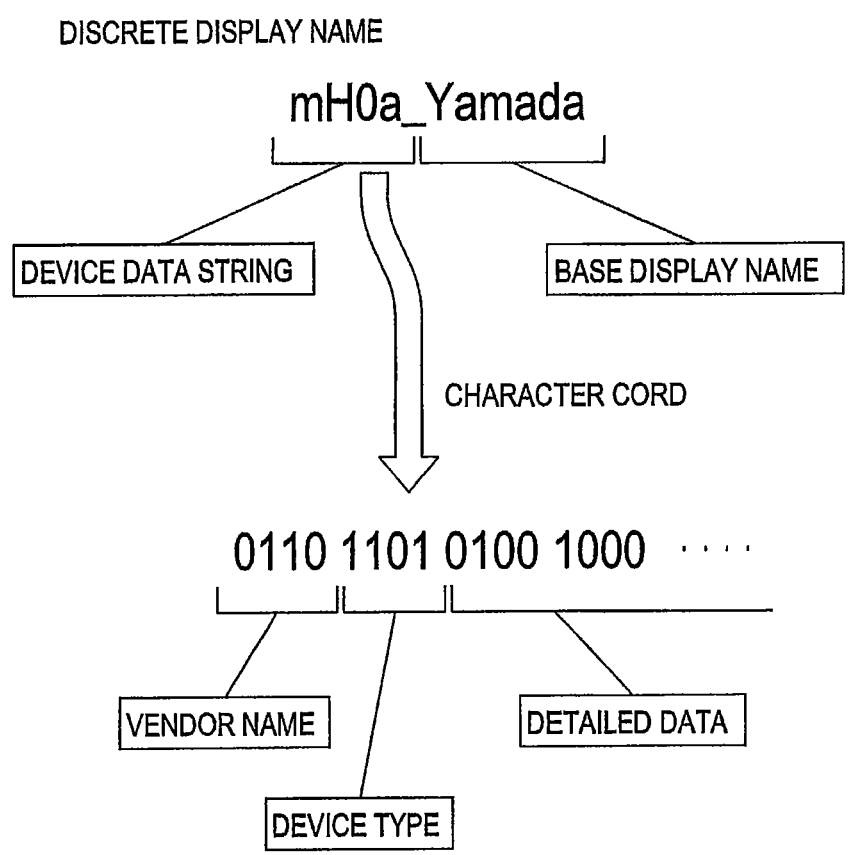
FIG. 10 is an explanatory diagram showing an example of encoding a device data string.

Next, a first variation of the first embodiment will be described. In the first variation, a process is performed to encode the device data string in the discrete display name after the device data string adding processor 5 has added the device data string. FIG. 10 shows an example of an encoded device data string.

Of the ASCII code 6dh (where h indicates a hexadecimal notation) for "m", 6h of the high-order four bits represents the header name, while dh of the low-order four bits represents the device type. Subsequent ASCII codes, such as 48h for "H" represent detailed data.

By encoding the terminal data in this variation, the length of the device data string in the discrete display name can be reduced, thereby storing a larger amount of information in a shorter length of data. This is particularly useful for conveying a large amount of information since the IP telephone application 20 can display a limited number of characters. In other words, the resources of an existing IP telephone system can be effectively utilized, even when the IP telephone application 20 displays the character string that includes the terminal data as the display name.

<Second Variation>

When a base display name is acquired in the first embodiment described above, a discrete display name is generated by adding a device data string representing the device name to the base display name. However, the device data string added to the base display name may be a character string indicating functions that can be controlled by the device, for example, instead of the device name. For example, the character string "print" may be added if the device has a print function, and the character string "OCR" may be added if the device has an OCR function. Hence, the exemplified system of the invention enables other IP telephone terminals to recognize which functions that the device can control by controlling the functions with the device name in this way. Accordingly, resources for implementing a print function or an OCR function that the IP telephone terminal can control can be effectively utilized from other IP telephone terminals. Here, "functions that the IP telephone terminal can control" may include both functions available on the IP telephone terminal itself and functions available on an external device connected to the IP telephone terminal that can be controlled by the IP telephone terminal. Further, the terminal data for identifying functions that the IP telephone terminal can control may be data that directly indicates the model or functions or may be a model name or other data that can be used to identify the functions. Encoded data may also be used to indirectly identify the functions.

<Third Variation>

Further, when a base display name is acquired in the first embodiment described above, a discrete display name is generated by adding a device data string to the base display name. However, rather than adding the device data string to the base display name, this device data string may be recorded in another field of the user data (such as the user profile). In this way, the IP telephone application installed on a network terminal can allow other IP telephone terminals to recognize data on the network terminal itself or on devices connected to the network terminal by associating this data with the corresponding display name.

Second Embodiment

Figure 11:
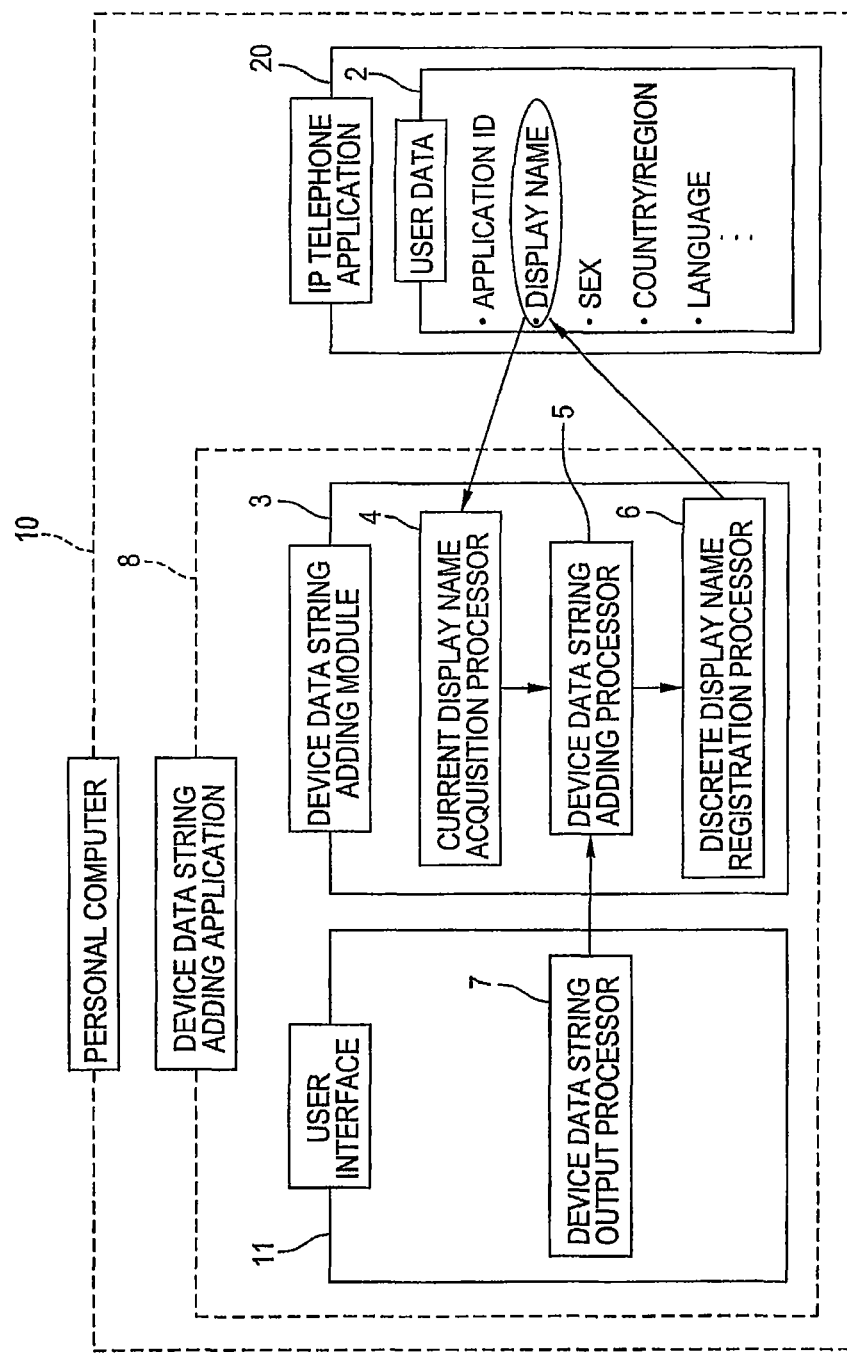
FIG. 11 is a block diagram showing the relationship between an IP telephone application and a device data string adding application operating in collaboration with the IP telephone application according to a second embodiment.

Next, a second embodiment of the invention will be described. FIG. 11 is a block diagram showing the relationship between an IP telephone application 20 and a device data string adding application 8 operating in collaboration with the IP telephone application 20 according to the second embodiment. The second embodiment differs from the first embodiment described above only in that the device data string output processor 7 operates within a user interface 11. Therefore, like parts and components with those in the first embodiment have been designated with the same reference numerals to avoid duplicating description.

As shown in FIG. 11, the IP telephone application 20 and the device data string adding application 8 are provided in the personal computer 10. The current display name acquisition processor 4 of the device data string adding module 3 acquires the current display name of the IP telephone application 20 by issuing a Windows message to the API of the IP telephone application 20.

The user interface 11 acquires the device data string by enabling the user to select from among a list of device data string candidates through input on a keyboard (not shown) or with a mouse (not shown), for example. The device data string output processor 7 outputs the device data string acquired by the user interface 11 to the device data string adding processor 5. The device data string adding processor 5 generates a discrete display name by adding the base display name from the current display name acquired by the current display name acquisition processor 4 to the device data string outputted from the device data string output processor 7.

In the second embodiment, the device data string acquired by the user interface 11 is added to the base display name of the current display name and the result is recorded as the discrete display name. In this way, the user can freely record data to be made available to an external terminal ET. The status on the user's side can be accurately conveyed to another IP telephone so that resources of a bi-directional network terminal are not wasted.

Third Embodiment

Figure 12:
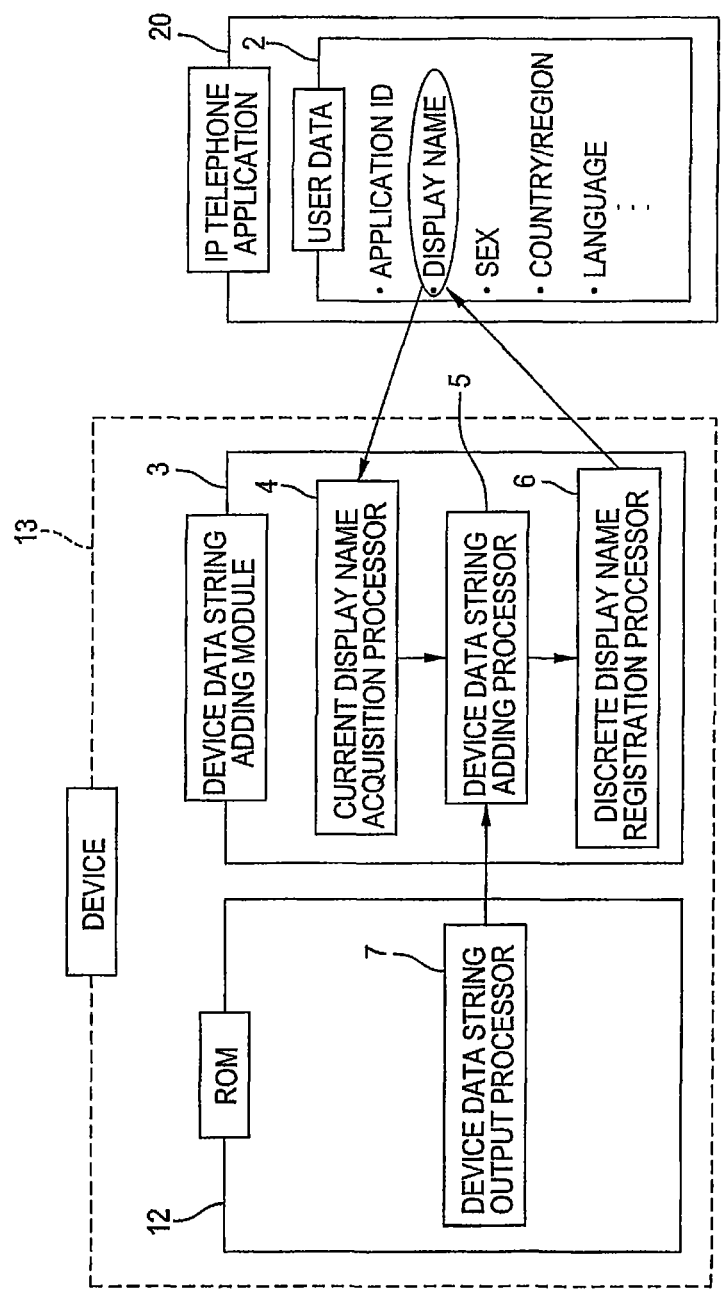
FIG. 12 is a block diagram showing the relationship between an IP telephone application and a device data string adding module according to a third embodiment.

Next, a third embodiment of the invention will be described. FIG. 12 is a block diagram showing the relationship between the IP telephone application 20 and the device data string adding module 3 according to the third embodiment. The system of the third embodiment differs from the first embodiment in that the device data string adding module 3 and the device data string output processor 7 are provided in a peripheral device 13 rather than the personal computer 10. This difference will be described in greater detail below, while like parts and components are designated with the same reference numerals to avoid duplicating description.

The IP telephone application 20 in the third embodiment is installed on a network terminal, such as the personal computer 10, and the device data string adding module 3 and device data string output processor 7 are provided in the peripheral device 13. The current display name acquisition processor 4 of the device data string adding module 3 acquires the current display name for a user of the IP telephone application 20 by issuing a Windows message to the API of the IP telephone application 20 through an interface provided between the device and the network terminal.

The peripheral device 13 is also provided with a ROM 12 storing preset device data. The device data string output processor 7 functions to read the preset device data and output this data to the device data string adding processor 5 of the device data string adding module 3. Hence, the IP telephone application 20 can acquire device data for a telephone terminal connected to the IP telephone application 20 (network terminal) and can register the terminal data as the display name of the IP telephone application 20.

In this way, an IP telephone system having no server can include terminal data in the registered display name of the IP telephone application 20. Accordingly, other IP telephones can recognize the terminal data of telephone terminals connected to the network terminal. The elements depicted in FIG. 13 are the same as the similarly numbered elements depicted in FIG. 12, except that, in the embodiment of FIG. 13, the IP telephone application 20 is provided within the peripheral device 13A.

Figure 13:
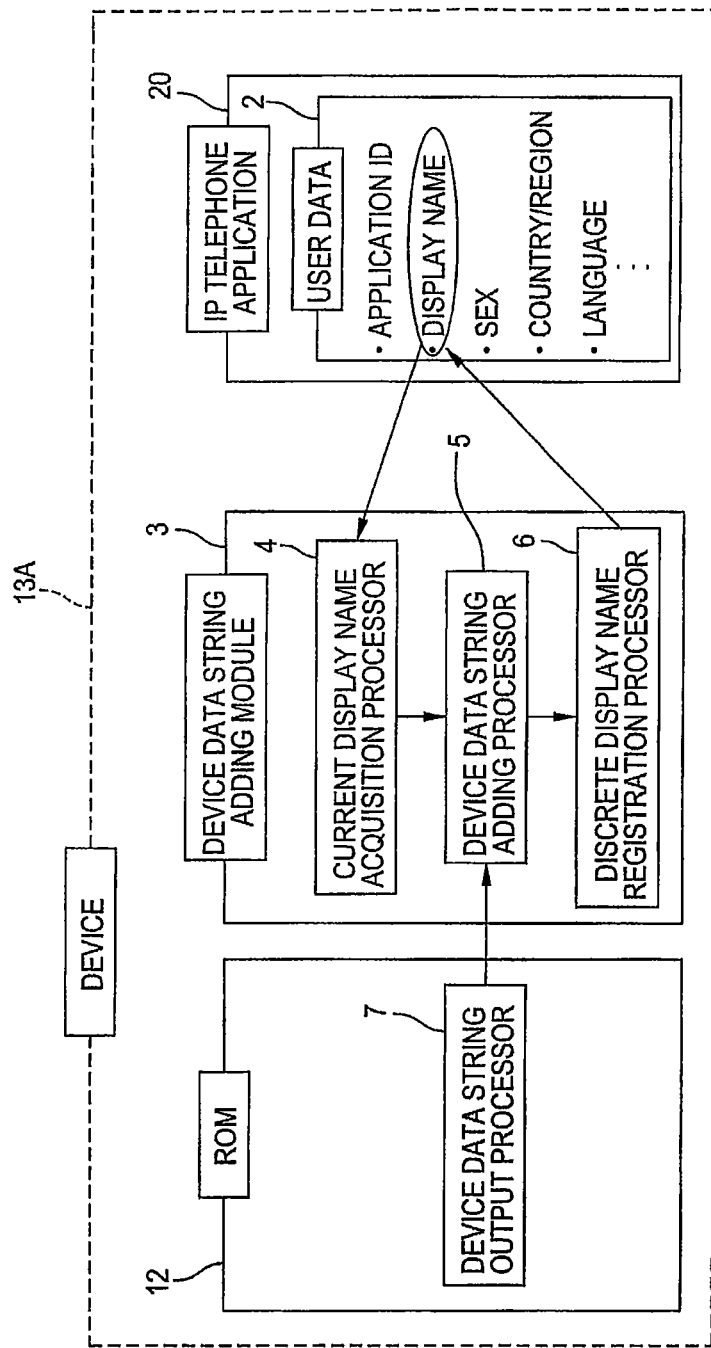
FIG. 13 is a block diagram showing the relationship between an IP telephone application and a device data string adding module according to a fourth embodiment.

As depicted in FIG. 13, the IP telephone application 20, device data string adding module 3, and device data string output processor 7 are all provided within the peripheral device 13A. Further, an IP telephone can be implemented with a standalone device, even when the system in which the standalone IP telephone operates has no network terminal.

Fifth Embodiment

Figure 14:
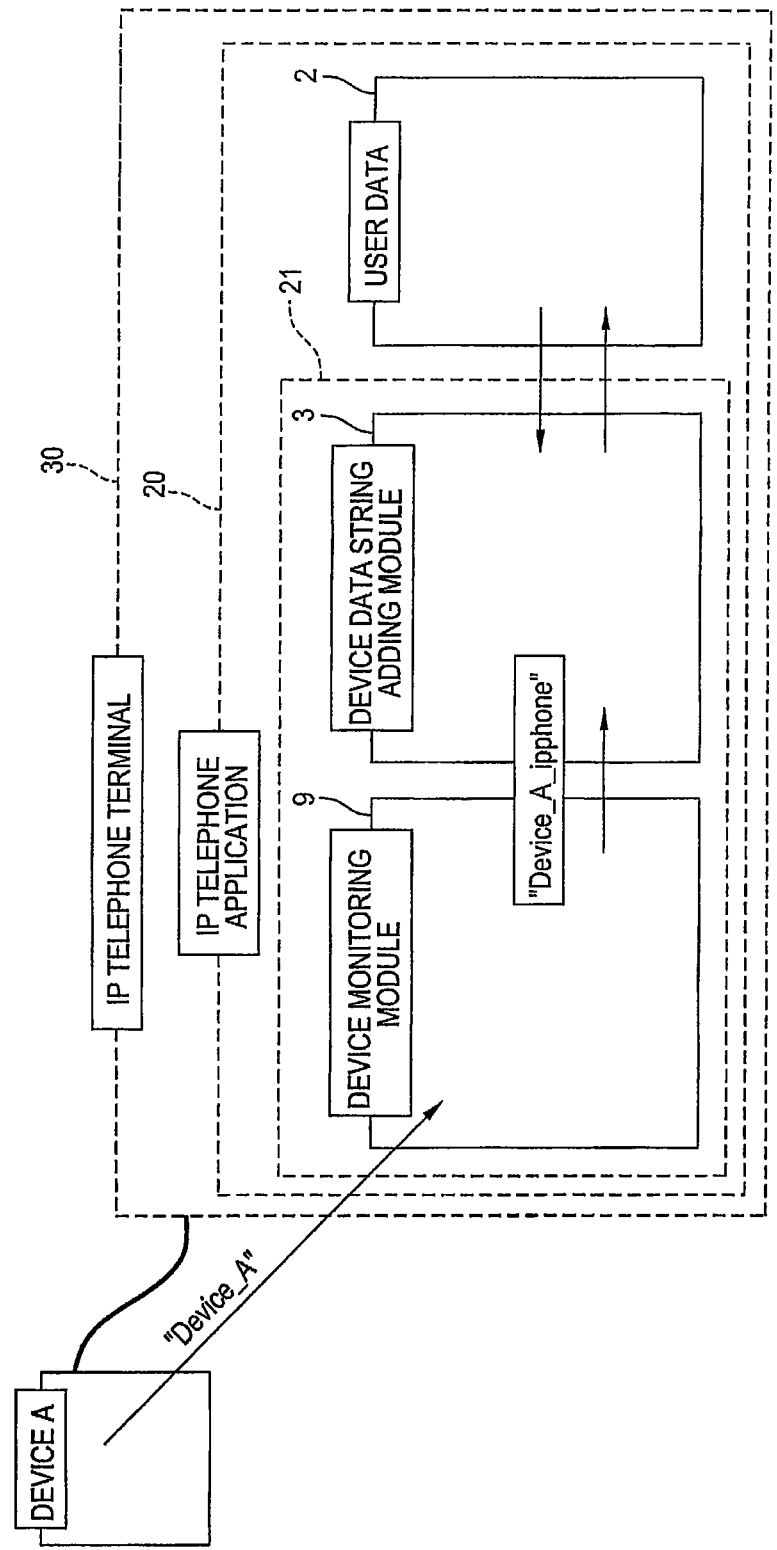
FIG. 14 is a block diagram showing the relationship between an IP telephone application and an IP telephone terminal on which the application is installed according to a fifth embodiment.

Next, a fifth embodiment of the IP telephone terminal, IP telephone system, and communication program will be described with reference to FIGS. 14 and 15. FIG. 14 is a block diagram showing the relationship between an IP telephone terminal 30 and an IP telephone application 20 installed on the IP telephone terminal 30 according to the fifth embodiment.

As shown in FIG. 14, the system according to the fifth embodiment differs from that of the first embodiment in that a device data string adding module 21 corresponding to the application 8 (see FIG. 4) of the first embodiment is incorporated in the IP telephone application 20. The remaining structure is similar to that described in the first embodiment and, hence, like parts and components other than the IP telephone application 20 and device data string adding module 21 are designated with the same reference numerals to avoid duplicating description. Further, since the device data string adding module 21 has substantially the same operations and effects as the device data string adding application 8 described above, a detailed description of the device data string adding module 21 will not be repeated.

Next, a process performed on the IP telephone system 22 described above will be described. In this process, the IP telephone application 20 installed on the IP telephone terminal 30 acquires data from a device 70 connected to the IP telephone terminal 50 and processes this data on the device 40 connected to the IP telephone terminal 30.

FIG. 15 is a sequence chart illustrating the flow of processes performed on the IP telephone system 22 according to the fifth embodiment. As an initial step, the IP telephone application 60 searches for user devices on the Internet through a broadcast targeting IP telephone applications (the IP telephone application 20 and the like) installed on other personal computers and IP telephone terminals. In response, the IP telephone application 20 and the like transmit a discrete display name registered as described in the above process to the IP telephone application 60.

More precisely, the IP telephone application 20 transmits a discrete display name newly generated by combining terminal data with the current display name to the Internet 80, and the IP telephone application 60 acquires this discrete display name via the Internet 80. In this way, terminal data can be transmitted and received using the existing system for transmitting and receiving the display name, and the IP telephone terminal 50 can easily receive the display name together with the terminal data, thereby more effectively utilizing the processing resources on other IP telephone terminals.

While the IP telephone application 20 in the above description transmits a discrete display name generated by combining terminal data with the display name, the IP telephone application 20 may be configured to transmit other data, provided that the data has a format from which a correlation between the terminal data and display name can be derived.

In some cases, a special user device called a supernode may be employed to manage all registration data including the display names of IP telephone applications. In such cases, the supernode returns registration data for each IP telephone application in response to a search performed by the IP telephone application 60. This configuration may also be employed in the other embodiments. Further, if the network terminal is configured to register identification data identifying the network terminal itself in a supernode that manages identification data for IP telephone terminals, the transmitting means may use this existing structure to transmit the correlated identification data and terminal data to the supernode to be registered therein. In this case, other IP telephone terminals can acquire the registered identification data and terminal data from the supernode.

In P1 of the process shown in FIG. 15, the IP telephone application 60 of the IP telephone terminal 50 executes a process to acquire a list of contacts. The contact list is a list of user devices that are candidates for telephone communications with the IP telephone application 60 and includes display names and the like that the IP telephone application 60 acquired from IP telephone applications installed on other personal computers.

In P2 the IP telephone application 60 executes a process for selecting a receiving terminal and a function to use. In this process, the IP telephone application 60 displays the display names registered in the contact list (including the discrete display name acquired from the IP telephone application 20) on a liquid crystal display (LCD; not shown) of the IP telephone terminal 50. At this time, the user can make a selection from the terminal data included in the identification data by viewing functions that can be controlled on other IP telephone terminals and the model names of the other IP telephone terminals.

The following description will assume that the user of the IP telephone terminal 50 selects the IP telephone terminal 30 as the receiving terminal and selects the print function from the functions available on the IP telephone terminal 30 as the function to use. Subsequently, the IP telephone application 60 issues a command to the device 70 (see FIG. 14) connected to the IP telephone terminal 50 to acquire data needed for the selected function.

In P3 the device 70 acquires the requested data for the selected function and transmits the acquired data to the IP telephone application 60. For example, the device 70 scans an image and transmits the scanned image data to the IP telephone application 60 in the IP telephone terminal 50. In P4 the IP telephone application 60 generates image data and command data to be transmitted to the IP telephone terminal 30. Here, the image data and command data are generated based on the type of process to be performed on the destination device with the acquired data.

In P5 the IP telephone application 60 issues a command to the IP telephone terminal 50 to transmit the data generated in P4 to the IP telephone application 20. Next, the IP telephone application 60 issues a command to the IP telephone application 20 to confirm data transmission authorization. In P6 the IP telephone application 20 monitors received data for a command to confirm data transmission authorization. At this time, the IP telephone application 20 detects such a command transferred from the IP telephone application 60.

In P7 the IP telephone application 20 performs a process to specify a location for saving reception data in response to the command detected from the IP telephone application 60, and subsequently returns a command to confirm data transmission authorization to the IP telephone application 60. In P8 the IP telephone application 60 monitors received data for a command to confirm authorization for data transmission, and subsequently detects such authorization transferred from the IP telephone application 20.

In P9 the IP telephone application 60 executes a data transmission function. Specifically, the IP telephone application 60 attaches the command data corresponding to the print function of the device 40 selected by the user and generated in P4 to the image data generated in P4 and transmits this data to the IP telephone application 20. In P10 the IP telephone application 20 waits for the transmission data and subsequently receives the data transmitted in P9.

In P11 the IP telephone application 20 interprets the command data within the data received from the IP telephone application 60. If the IP telephone application 20 determines that the interpreted command is a function execution request specifying a function on an external device, the IP telephone application 20 outputs a data processing command for the specified function to the device 40. In P12 the device 40 performs a data process using the specified function based on the data processing command.

Through the processes P1-P12 described above, data for the selected function is acquired from the device 70, and the device 40 performs a data process with the selected function using the acquired data.

In the fifth embodiment described above, the IP telephone terminal 30 can enable the other IP telephone terminal 50 to recognize the functions that the IP telephone terminal 30 possesses in order that the IP telephone terminal 50 can effectively utilize the resources of the IP telephone terminal 30. In this way, the functions of the IP telephone terminal 30 can be sufficiently utilized by other IP telephone terminals. Further, by enabling the other IP telephone terminal 50 to recognize what type of device 40 is connected to the IP telephone terminal 30 or to recognize the functions possessed by the device 40, the IP telephone terminal 50 can sufficiently use the functions of the device 40, thereby effectively utilizing resources of external devices that can be controlled by the IP telephone terminal 30.

<Fourth Variation>

In the fifth embodiment described above, the IP telephone terminal 30 can perform a process to transmit a discrete display name and a process to control execution of functions based on received data using the IP telephone application 20. However, the IP telephone terminal 30 may instead be configured to perform such processes using the device data string adding application 8 working in collaboration with the IP telephone application 20.

<Fifth Variation>

While the IP telephone terminals 30 and 50 in the fifth embodiment described above are telephones provided with transceivers, IP telephone communications may be implemented between PCs on which are installed the IP telephone applications 20 and 60.

While the invention has been described in detail with reference to specific embodiments thereof, it would be apparent to those skilled in the art that many modifications and variations may be made therein without departing from the spirit of the invention, the scope of which is defined by the attached claims. For example, while the devices connected to the network terminal are described as telephone terminals in the preferred embodiments, the present invention may also be applied to a facsimile machine or other device capable of implementing voice data communications.

While the system of the preferred embodiments described above is configured so that devices output device data strings in advance, and a device data string adding module acquires and uses these device data strings, the device data string adding module may manage function data corresponding to the models of the devices. In this case, the devices output data identifying their models, and the device data string adding module acquires this data and creates a device data string based thereon.

The device may also be provided with a voice I/O function, such as a speaker and microphone. The user uses the speaker and microphone provided in the device to make a telephone call on an IP telephone, and device data for the device making the telephone call is registered in the IP telephone application. In this case, the IP telephone application outputs voice data received from another IP telephone terminal through the speaker of the device and transmits voice data inputted into the microphone of the device to the other IP telephone terminal.

Further, the device data string adding application serves as an intermediary application for mediating the exchange of event messages between the IP telephone application and the device. In other words, the IP telephone application and the device transmit an event message to the intermediary application, and the intermediary application relays messages from the IP telephone application to the device and messages from the device to the IP telephone application.

For example, when the IP telephone application receives a call request from another IP telephone terminal, the IP telephone application transfers a call request event to the device via the intermediary application. If the user operates the device to indicate acceptance of the call, this acceptance event is conveyed to the IP telephone application, after which the telephone call begins.

When the intermediary application receives an instruction from the device indicating acceptance of the call, the application may execute the process shown in the flowchart of FIG. 6, for example. In this process, all determinations in S1-S3 of FIG. 6 are "YES", and in S4 the application records the device data string of the device from which the instruction to accept the call originated in the IP telephone application.

On the other hand, if the user operates the device to input an instruction to search for other user devices, the device conveys a search instruction event to the IP telephone application via the intermediary application, and the IP telephone application transmits a request to the Internet to search for user devices. After receiving a contact list as a result of this search, the IP telephone application transfers the contact list to the device via the intermediary application, and the device displays this list on a display unit.

At this time, the user can operate the device to select a call destination from the displayed contact list. When the user inputs a call instruction after selecting a contact, the device conveys a call request event to the IP telephone application via the intermediary application, and the IP telephone application transmits a call request to the IP telephone terminal at the call destination and subsequently waits for permission to implement the call.

Upon obtaining an instruction from the device requesting a telephone call, the intermediary application executes the process shown in the flowchart of FIG. 6, for example. In this process, all determinations in S1-S3 of FIG. 6 are "YES", and in S4 the intermediary application records device data for the device from which the instruction requesting a telephone call originated in the IP telephone application.

Further, when the IP telephone application receives a request from another IP telephone terminal to transfer a file, the IP telephone application transmits a file transfer request event to the device via the intermediary application. When the user operates the device to input an instruction allowing the file transfer, the device transmits this event to the IP telephone application, the IP telephone application returns data permitting the file transfer to the other IP telephone terminal, and the other IP telephone terminal transfers the file.

Further, when one IP telephone terminal receives a file transfer request from another IP telephone terminal during a telephone call or a chat session with the other IP telephone terminal, the first IP telephone terminal may return a transfer allowed event to the IP telephone application without transferring a file transfer request event to the device. Further, when the IP telephone application receives the file, the application may transfer a file reception event to the intermediary application.

The intermediary application may be configured to control execution of a function specified by another IP telephone terminal. In this case, the intermediary application confirms the filename and file content upon receiving a file reception event. If the filename or contents direct the execution of a function provided on the PC or peripheral device, the intermediary application may control execution of the function specified by the other IP telephone terminal by issuing an instruction to software on the PC, transferring the file content to the peripheral device, and instructing the peripheral device to execute the function provided on the device.

What is claimed is:

1. An IP telephone terminal comprising:
an identification data storing section that stores a display name consisting of a first character string identifying the IP telephone terminal;
a monitoring section configured to monitor an available function of an external device connected to the IP telephone terminal through a non-Internet connection, the available function being indicated as terminal data consisting of a second character string;
a combining section configured to add the terminal data indicating the available function and the display name stored in the identification data storing section, with a delimiter provided between the terminal data and the display name, to generate a discrete display name, when the monitoring section detects the available function;
an updating section configured to store the discrete display name generated by the combining section as a new discrete display name in the identification data storing section;
a transmitting section configured to transmit the discrete display name stored in the identification data storing section over the Internet to a second IP telephone terminal in a manner that the discrete display name can be displayed with a third terminal display name identifying a third IP telephone terminal transmitted from the third IP telephone terminal at the second IP telephone terminal for a selection to be made of either one of the IP telephone terminal and the third IP telephone terminal;
a communicating section configured to establish IP telephone communications with the second IP telephone terminal via the Internet when the second IP telephone terminal transmits a command to the IP telephone terminal to establish the IP telephone communications after the transmitting section transmits the discrete display name over the Internet to the second IP telephone terminal;
an IP telephone function controlling section configured to control an IP telephone function used to implement a telephone call through the IP telephone communications with the second IP telephone terminal, after the communicating section establishes the IP telephone communications with the second IP telephone terminal; and
a function execution controlling section configured to receive target data to be processed by the available function from the second IP telephone terminal through the IP telephone communications with the second IP telephone terminal after the communicating section establishes the IP telephone communications with the second IP telephone terminal, and then the function executing controlling section being configured to process the target data by using the available function.

2. The IP telephone terminal according to claim 1, further comprising:
a connecting section that connects the external device to the IP telephone terminal; and
a connection determining section that is configured to determine whether the external device is connected to or disconnected from the connecting section,
wherein when the monitoring section determines that the external device is connected to the connection section, the monitoring section is configured to obtain information related to the available function of the external device and is configured to update the terminal data, and
wherein, when the monitoring section determines that the external device is disconnected from the connection section, the monitoring section is configured to delete the available function of the disconnected external device and is configured to update the terminal data.

3. The IP telephone terminal according to claim 2, wherein the external device comprises at least one of:
a print function for printing print data on a recording medium print, and
an optical character recognition function for reading characters comprised in an image reproduced from image data;
wherein, when the function execution controlling section receives a command for the external device to print the target data, the function execution controlling section is configured to execute the print function, and
wherein, when the function execution controlling section receives a command for the external device to recognize characters in an image reproduced from the target data, the function execution controlling section is configured to execute the optical character recognition function.

4. The IP telephone terminal according to claim 2, wherein the monitoring section is configured to obtain the information from the external device.

5. The IP telephone terminal according to claim 1, wherein the second character string of the terminal data indicates a model of the external device, and the updating section is configured to update the second character string indicating the model of the external device as the terminal data.

6. The IP telephone terminal according to claim 1, wherein the function execution controlling section is configured to control a function specified in an instruction received from the second IP telephone terminal.

7. The IP telephone terminal according to claim 1, wherein the combining section is configured to combine the first character string of the display name, the second character string of the terminal data, and a character string indicating a delimiter between the display name and the terminal data.

8. An IP telephone system comprising:
a first IP telephone terminal; and
a second IP telephone terminal connected to the first IP telephone terminal via the Internet,
wherein the first IP telephone terminal comprises:
an identification data storing section that stores a display name consisting of a first character string identifying the first IP telephone terminal;
a monitoring section configured to monitor an available function of an external device connected to the first IP telephone terminal through a non-Internet connection, the available function being indicated as terminal data consisting of a second character string;
a combining section configured to add the terminal data indicating the available function and the display name stored in the identification data storing section, with a delimiter provided between the terminal data and the display name, to generate a discrete display name, when the monitoring section detects the available function;
an updating section configured to store the discrete display name generated by the combining section as a new discrete display name in the identification data storing section;
a transmitting section configured to transmit the discrete display name stored in the identification data storing section over the Internet to the second IP telephone terminal in a manner that the discrete display name can be displayed with a third terminal display name identifying a third IP telephone terminal transmitted from the third IP telephone terminal at the second IP telephone terminal for a selection to be made of either one of the first IP telephone terminal and the third IP telephone terminal;
a communicating section configured to establish IP telephone communications with the second IP telephone terminal via the Internet when the second IP telephone terminal transmits a command to establish IP telephone communications after the transmitting section transmits the discrete display name over the Internet to the second IP telephone terminal;
an IP telephone function controlling section configured to control an IP telephone function used to implement a telephone call through the IP telephone communications with the second IP telephone terminal, after the communicating section establishes the IP telephone communications with the second IP telephone terminal; and
a function execution controlling section configured to receive target data to be processed by the available function from the second IP telephone terminal after the communicating section establishes the IP telephone communications with the second IP telephone terminal, and then the function execution controlling section being configured to process the target data by using the available function;

wherein the second IP telephone terminal comprises:
a receiving section configured to receive the discrete display name transmitted from the first IP telephone terminal and device information transmitted from the third IP telephone terminal via the Internet;
a displaying section configured to display the received discrete display name and the device information as a possible destination IP telephone terminal to which target data to be processed by the available function is transmitted, the displaying section being configured to allow a selection to be made of the destination IP telephone terminal from the displayed discrete display name and device information;
an input receiving section configured to receive a selection of the destination IP telephone terminal from among the displayed discrete display name and the third terminal display name;
a requesting section configured to transmit a request to establish IP telephone communications with the first IP telephone terminal in response to an input to the input receiving section, after the displayed discrete display name is selected as the destination IP telephone terminal;
a second IP telephone function controlling section configured to control an IP telephone function used to implement a telephone call through the IP telephone communications, after the IP telephone communications with the first IP telephone terminal are established; and
a second transmitting section configured to transmit the target data to be processed at the first IP telephone terminal by the available function of the first IP telephone terminal, after the IP telephone communications with the first IP telephone terminal are established.

9. A method of controlling an IP telephone system comprising a first IP telephone terminal and a second IP telephone terminal, the method comprising:
combining a display name consisting of a first character string identifying the first IP telephone terminal and terminal data consisting of a second character string indicating an available function of the first IP telephone terminal with a delimiter provided between the display name and the terminal data to generate a discrete display name and transmitting the discrete display name to the second IP telephone terminal via the Internet in a manner that the discrete display name can be displayed at the second IP telephone terminal with a third terminal display name identifying a third IP telephone terminal transmitted from the third IP telephone terminal for a selection to be made of one of the first IP telephone terminal and the third IP telephone terminal;
receiving the transmitted discrete display name at the second IP telephone terminal and displaying the received discrete display name and the third terminal display name on the second IP telephone terminal;
receiving a selection of an available function of the first IP telephone terminal to which target data is to be processed from the displayed discrete display name and the third terminal display name;
transmitting the target data to the first IP telephone terminal in response to the selection over the Internet; and
processing the target data at the first IP telephone terminal by using the selected available function.

10. The method according to claim 9, further comprising:
determining whether an external device is connected to a connection section of the first IP telephone terminal;

wherein, when the external device is connected to the connection section of the first telephone terminal, obtaining information related to an available function of the external device and updating the terminal data; and wherein, when the external device is disconnected from the connection section, deleting a second character string of the available function of the disconnected external device and updating the terminal data.

11. A non-transitory, computer-readable storage medium storing a set of program instructions configured to be executed by a computer, the program instructions instructing the computer to cooperate with a first IP telephone terminal, the computer comprising an identification data storing section that stores a display name consisting of a first character string identifying the first IP telephone terminal, the first IP telephone terminal comprising an IP telephone application installed thereon, and the program instructions comprising:

monitoring an available function of an external device connected to the first IP telephone terminal through a non-Internet connection, the available function being indicated as terminal data consisting of a second character string;

updating the terminal data when the monitoring section detects a change of the available function;

combining the display name and the terminal data with a delimiter provided between the display name and the terminal data to generate a discrete display name;

transmitting the discrete display name over the Internet to a second IP telephone terminal;

displaying the discrete display name on the second IP telephone terminal with a third terminal display name identifying a third IP telephone terminal transmitted from the third IP telephone terminal for a selection to be made of one of the first IP telephone terminal and the third IP telephone terminal before the second IP telephone terminal transmits target data to be processed by the first IP telephone terminal;

establishing IP telephone communications with the second IP telephone terminal via the Internet when the second IP telephone terminal transmits a command to the first IP telephone terminal to establish IP telephone communications, after the first IP telephone terminal is selected as a destination IP telephone terminal from the displayed discrete display name and the third terminal display name;

controlling an IP telephone function used to implement a telephone call through the IP telephone communications with the second IP telephone terminal, after the IP telephone communications with the second IP telephone terminal are established;

receiving the target data from the second IP telephone terminal through the IP telephone communications; and processing the received target data by using the available function, after the IP telephone communications with the second IP telephone terminal are established.

12. The non-transitory, computer-readable storage medium according to claim 11, wherein the program instructions further comprise:

determining whether the external device is connected to or disconnected from the first IP telephone terminal;

obtaining information related to an available function of the external device when the external device is determined to be connected to the first IP telephone terminal and updating the terminal data; and deleting the available function of the disconnected external device and updating the terminal data when the external device is determined to be disconnected from the first IP telephone terminal.

13. The non-transitory, computer-readable storage medium according to claim 11, wherein the program instructions further comprise:

reading the display name stored in the identification data storing section by using an application program interface provided by the IP telephone application;

wherein, when an external device is determined to be connected to the first IP telephone terminal, updating the terminal data and combining the display name and the updated terminal data of the external device; and wherein, when the external device is determined to be disconnected from the first IP telephone terminal, updating the terminal data, and combining the display name and the terminal data with a delimiter provided between the display name and the terminal data to generate a discrete display name to indicate that no external device is connected to the first IP telephone terminal.

14. A non-transitory, computer-readable storage medium storing a set of program instructions of an IP telephone assisting program configured to be executed by a computer, the program instructions of the IP telephone assisting program instructing the computer to cooperate with a first IP telephone terminal, the computer comprising an identification data storing section that stores a display name consisting of a character string identifying the first IP telephone terminal, the first IP telephone terminal comprising an IP telephone application installed thereon, and the program instructions comprising:

monitoring an available function of an external device connected to the first IP telephone terminal, the available function being indicated as terminal data consisting of a second character string;

updating the terminal data when the monitoring section detects a change of the available function; and combining the display name and the terminal data with a delimiter provided between the display name and the terminal data to generate a discrete display name and transmitting the discrete display name to the IP telephone assisting program, wherein the IP telephone assisting program comprises program instructions comprising:

transmitting the discrete display name over the Internet to a second IP telephone terminal;

displaying the discrete display name on the second IP telephone terminal;

establishing IP telephone communications with the second IP telephone terminal via the Internet when the second IP telephone terminal transmits a command to the first IP telephone terminal to establish IP telephone communications, when the first IP telephone terminal is selected as a destination IP telephone terminal from the displayed discrete display name at the second IP telephone terminal;

controlling an IP telephone function used to implement a telephone call through the IP telephone communications with the second IP telephone terminal, after the IP telephone communications are established;

receiving the target data from the second IP telephone terminal through the IP telephone communications, after the IP telephone communications are established; and transmitting the received target data to the IP telephone application to process the received target data by using the available function.

\* \* \* \* \*